US009386507B1

(12) United States Patent
Ramalingam et al.

(10) Patent No.: US 9,386,507 B1
(45) Date of Patent: *Jul. 5, 2016

(54) MOBILE DEVICE SECURITY

(71) Applicant: Amazon Technologies, Inc., Reno, NV (US)

(72) Inventors: Harsha Ramalingam, Kirkland, WA (US); Michael Carr, Bellevue, WA (US); Paul J. Walsh, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/821,337

(22) Filed: Aug. 7, 2015

Related U.S. Application Data

(63) Continuation of application No. 13/973,870, filed on Aug. 22, 2013, now Pat. No. 9,107,064, and a continuation of application No. 12/820,816, filed on Jun. 22, 2010, now Pat. No. 8,521,131.

(60) Provisional application No. 61/316,527, filed on Mar. 23, 2010.

(51) Int. Cl.
*H04W 48/04* (2009.01)
*H04M 1/725* (2006.01)
(Continued)

(52) U.S. Cl.
CPC .......... *H04W 48/04* (2013.01); *H04M 1/72577* (2013.01); *H04W 4/021* (2013.01); *H04W 4/028* (2013.01); *H04W 12/02* (2013.01); *H04W 12/06* (2013.01); *H04W 12/08* (2013.01)

(58) Field of Classification Search
CPC . H04W 48/04; H04W 1/72577; H04W 4/021; H04W 4/028; H04W 12/02; H04W 12/08; H04W 12/06

USPC ........ 455/410–411, 456.1–457, 414.1–414.4, 455/404.1–404.2
See application file for complete search history.

(56) References Cited

U.S. PATENT DOCUMENTS

| 5,294,472 A | 3/1994 | Arnold et al. |
| 5,914,472 A | 6/1999 | Foladare et al. |

(Continued)

FOREIGN PATENT DOCUMENTS

| JP | 2000134147 | 5/2000 |
| JP | 2001222593 A | 8/2001 |

(Continued)

OTHER PUBLICATIONS

U.S. Appl. No. 61/14210, Garrett.
(Continued)

*Primary Examiner* — Sharad Rampuria
(74) *Attorney, Agent, or Firm* — Kilpatrick Townsend & Stockton LLP

(57) ABSTRACT

Techniques for providing friction-free transactions using geolocation and user identifiers are described herein. These techniques may ascertain a user's location based on a location of a mobile device. A transaction between the user and a merchant may be completed with zero or minimal input from the user based on the geolocation of the mobile device and the user identifiers. In some implementations, a transaction initiated earlier is completed when the mobile device arrives at the merchant. Additionally, a parent-child or similar relationship may be established between multiple devices. Security on the mobile device based may be provided by biometric identification and calculation of variance from regular movement patterns. Advertisements may be sent to the mobile device based on bids from merchants near to the mobile device. Promotions may be sent to the mobile device when more than a threshold number of mobile devices are located at the same merchant.

20 Claims, 17 Drawing Sheets

(51) Int. Cl.
 *H04W 4/02* (2009.01)
 *H04W 12/08* (2009.01)
 *H04W 12/02* (2009.01)
 *H04W 12/06* (2009.01)

(56) References Cited

U.S. PATENT DOCUMENTS

| | | | |
|---|---|---|---|
| 6,108,650 | A | 8/2000 | Musk et al. |
| 6,173,269 | B1 | 1/2001 | Solokl et al. |
| 6,327,348 | B1 | 12/2001 | Walker et al. |
| 6,343,279 | B1 | 1/2002 | Bissonette et al. |
| 6,505,046 | B1 | 1/2003 | Baker |
| 6,597,770 | B2 | 7/2003 | Walker et al. |
| 6,738,749 | B1 | 5/2004 | Chasko |
| 6,756,879 | B2 | 6/2004 | Shuster |
| 7,392,534 | B2 | 6/2008 | Lu et al. |
| 7,434,723 | B1 | 10/2008 | White et al. |
| 7,657,489 | B2 | 2/2010 | Stambaugh |
| 7,725,390 | B2 | 5/2010 | Plant |
| 7,739,197 | B2 | 6/2010 | Jambunathan et al. |
| 7,788,281 | B2 | 8/2010 | Cole et al. |
| 7,813,717 | B2 | 10/2010 | Huotari et al. |
| 7,840,222 | B2 | 11/2010 | Hampel et al. |
| 7,853,786 | B1 | 12/2010 | Fultz et al. |
| 7,873,708 | B2 | 1/2011 | Durand et al. |
| 7,899,742 | B2 | 3/2011 | Benkert et al. |
| 7,900,847 | B2 | 3/2011 | Lindahl et al. |
| 8,050,991 | B2 | 11/2011 | Popovic et al. |
| 8,099,109 | B2 | 1/2012 | Altman et al. |
| 8,116,731 | B2 | 2/2012 | Buhrmann et al. |
| 8,135,624 | B1 | 3/2012 | Ramalingam et al. |
| 8,140,403 | B2 | 3/2012 | Ramalingam et al. |
| 8,213,898 | B2 * | 7/2012 | Choti .............. G06Q 10/0875 455/404.2 |
| 8,255,698 | B2 | 8/2012 | Li et al. |
| 8,326,767 | B1 | 12/2012 | Ramanujan et al. |
| 8,341,029 | B1 * | 12/2012 | Ramalingam ......... G06Q 20/10 705/26.1 |
| 8,447,651 | B1 | 5/2013 | Scholl et al. |
| 8,521,131 | B1 | 8/2013 | Ramalingam et al. |
| 8,606,322 | B2 | 12/2013 | Sabol |
| 8,744,488 | B2 | 6/2014 | Cousins et al. |
| 8,849,310 | B2 | 9/2014 | Fan et al. |
| 8,863,307 | B2 * | 10/2014 | Sorek ................ G06Q 20/4016 340/5.2 |
| 9,058,604 | B2 | 6/2015 | Carr et al. |
| 9,107,064 | B1 | 8/2015 | Ramalingam et al. |
| 2001/0025257 | A1 | 9/2001 | Sato |
| 2001/0051911 | A1 | 12/2001 | Marks et al. |
| 2002/0046116 | A1 | 4/2002 | Hohle et al. |
| 2002/0065713 | A1 | 5/2002 | Awada et al. |
| 2002/0077876 | A1 | 6/2002 | O'Meara et al. |
| 2002/0091568 | A1 | 7/2002 | Kraft et al. |
| 2002/0123938 | A1 | 9/2002 | Yu et al. |
| 2002/0133467 | A1 | 9/2002 | Hobson et al. |
| 2002/0143638 | A1 | 10/2002 | August et al. |
| 2003/0159066 | A1 | 8/2003 | Staw et al. |
| 2003/0208386 | A1 | 11/2003 | Brondrup |
| 2003/0208684 | A1 | 11/2003 | Camacho et al. |
| 2003/0212609 | A1 | 11/2003 | Blair et al. |
| 2003/0220835 | A1 | 11/2003 | Barnes, Jr. |
| 2004/0002897 | A1 | 1/2004 | Vishik |
| 2004/0019563 | A1 | 1/2004 | Sines et al. |
| 2004/0039694 | A1 | 2/2004 | Dunn et al. |
| 2004/0056101 | A1 | 3/2004 | Barkan et al. |
| 2004/0093620 | A1 | 5/2004 | Iino et al. |
| 2005/0004840 | A1 | 1/2005 | Wanninger |
| 2005/0021773 | A1 | 1/2005 | Shiga et al. |
| 2005/0177442 | A1 | 8/2005 | Sullivan et al. |
| 2005/0221843 | A1 | 10/2005 | Friedman et al. |
| 2005/0228719 | A1 | 10/2005 | Roberts et al. |
| 2005/0234771 | A1 | 10/2005 | Register et al. |
| 2005/0240472 | A1 | 10/2005 | Postrel |
| 2005/0267812 | A1 | 12/2005 | Jensen et al. |
| 2005/0288719 | A1 | 12/2005 | Zhang et al. |
| 2006/0047576 | A1 | 3/2006 | Aaltonen et al. |
| 2006/0111955 | A1 | 5/2006 | Winter et al. |
| 2006/0164189 | A1 | 7/2006 | Shimizu et al. |
| 2006/0235795 | A1 | 10/2006 | Johnson et al. |
| 2006/0235796 | A1 | 10/2006 | Johnson et al. |
| 2006/0242017 | A1 | 10/2006 | Libes et al. |
| 2007/0084913 | A1 | 4/2007 | Weston |
| 2007/0088610 | A1 | 4/2007 | Chen |
| 2007/0118426 | A1 | 5/2007 | Barnes, Jr. |
| 2007/0136140 | A1 | 6/2007 | Smith |
| 2007/0291710 | A1 | 12/2007 | Fadell |
| 2008/0004949 | A1 | 1/2008 | Flake et al. |
| 2008/0005104 | A1 | 1/2008 | Flake et al. |
| 2008/0010121 | A1 | 1/2008 | McIntosh |
| 2008/0027810 | A1 | 1/2008 | Lerner et al. |
| 2008/0040233 | A1 | 2/2008 | Wildman et al. |
| 2008/0040274 | A1 | 2/2008 | Uzo |
| 2008/0086767 | A1 | 4/2008 | Kulkarni et al. |
| 2008/0140522 | A1 | 6/2008 | Tutone |
| 2008/0154765 | A1 | 6/2008 | Wolfe |
| 2008/0154847 | A1 | 6/2008 | Chellapilla et al. |
| 2008/0167991 | A1 | 7/2008 | Carlson et al. |
| 2008/0183576 | A1 | 7/2008 | Kim et al. |
| 2008/0183675 | A1 | 7/2008 | Schwarz et al. |
| 2008/0201226 | A1 | 8/2008 | Carlson et al. |
| 2008/0208739 | A1 | 8/2008 | Phillips |
| 2008/0215475 | A1 | 9/2008 | Ramer et al. |
| 2008/0221997 | A1 | 9/2008 | Wolfe |
| 2008/0228600 | A1 | 9/2008 | Treyz et al. |
| 2008/0262928 | A1 | 10/2008 | Michaelis |
| 2008/0268868 | A1 | 10/2008 | Maitland |
| 2008/0275768 | A1 | 11/2008 | Berman et al. |
| 2008/0281677 | A1 | 11/2008 | Toms et al. |
| 2008/0281702 | A1 | 11/2008 | Kirkwood |
| 2008/0318559 | A1 | 12/2008 | Porco |
| 2009/0005973 | A1 | 1/2009 | Salo et al. |
| 2009/0006203 | A1 | 1/2009 | Fordyce, III et al. |
| 2009/0024477 | A1 | 1/2009 | Kramer et al. |
| 2009/0024700 | A1 | 1/2009 | Garg et al. |
| 2009/0030779 | A1 | 1/2009 | Tollinger et al. |
| 2009/0061884 | A1 | 3/2009 | Rajan et al. |
| 2009/0076896 | A1 | 3/2009 | DeWitt et al. |
| 2009/0076925 | A1 | 3/2009 | DeWitt et al. |
| 2009/0125380 | A1 | 5/2009 | Otto et al. |
| 2009/0125396 | A1 | 5/2009 | Otto et al. |
| 2009/0132417 | A1 | 5/2009 | Scipioni et al. |
| 2009/0138302 | A1 | 5/2009 | Breznik et al. |
| 2009/0143966 | A1 | 6/2009 | Jacobson et al. |
| 2009/0150218 | A1 | 6/2009 | Brunner et al. |
| 2009/0152343 | A1 | 6/2009 | Carter et al. |
| 2009/0157547 | A1 | 6/2009 | Ruckart |
| 2009/0187463 | A1 | 7/2009 | DaCosta |
| 2009/0187466 | A1 | 7/2009 | Carter et al. |
| 2009/0187488 | A1 | 7/2009 | Shamilian |
| 2009/0187492 | A1 | 7/2009 | Hammad et al. |
| 2009/0198607 | A1 | 8/2009 | Badger et al. |
| 2009/0216646 | A1 | 8/2009 | Seven et al. |
| 2009/0222346 | A1 | 9/2009 | Greene et al. |
| 2009/0228325 | A1 | 9/2009 | Simmons et al. |
| 2009/0240582 | A1 | 9/2009 | Sheldon-Neal et al. |
| 2009/0240622 | A1 | 9/2009 | Zandonadi |
| 2009/0253408 | A1 * | 10/2009 | Fitzgerald ............ G06F 21/316 455/411 |
| 2009/0254930 | A1 | 10/2009 | Lo et al. |
| 2009/0271275 | A1 | 10/2009 | Regmi et al. |
| 2009/0281945 | A1 | 11/2009 | Shakkarwar |
| 2009/0287558 | A1 | 11/2009 | Seth et al. |
| 2009/0292642 | A1 | 11/2009 | Han |
| 2009/0299857 | A1 | 12/2009 | Brubaker |
| 2009/0313129 | A1 | 12/2009 | Rothschild |
| 2009/0327135 | A1 | 12/2009 | Nguyen et al. |
| 2009/0327151 | A1 | 12/2009 | Carlson et al. |
| 2010/0004997 | A1 | 1/2010 | Mehta et al. |
| 2010/0006641 | A1 | 1/2010 | Boutcher et al. |
| 2010/0006642 | A1 | 1/2010 | Boutcher et al. |
| 2010/0030592 | A1 | 2/2010 | Evans et al. |
| 2010/0030646 | A1 | 2/2010 | Riise et al. |
| 2010/0030651 | A1 | 2/2010 | Matotek et al. |
| 2010/0032339 | A1 | 2/2010 | Hasegawa et al. |

(56) References Cited

U.S. PATENT DOCUMENTS

| | | |
|---|---|---|
| 2010/0041419 A1 | 2/2010 | Svendsen et al. |
| 2010/0042421 A1 | 2/2010 | Bai et al. |
| 2010/0049615 A1 | 2/2010 | Rose et al. |
| 2010/0057530 A1 | 3/2010 | Parivash et al. |
| 2010/0063891 A1 | 3/2010 | Townsend et al. |
| 2010/0070334 A1 | 3/2010 | Monteverde |
| 2010/0070365 A1 | 3/2010 | Siotia et al. |
| 2010/0076829 A1 | 3/2010 | Bishop |
| 2010/0076849 A1 | 3/2010 | Bishop |
| 2010/0077036 A1 | 3/2010 | DeLuca et al. |
| 2010/0082420 A1 | 4/2010 | Trifiletti et al. |
| 2010/0082445 A1 | 4/2010 | Hodge et al. |
| 2010/0088188 A1 | 4/2010 | Kumar et al. |
| 2010/0100454 A1 | 4/2010 | Sines et al. |
| 2010/0106611 A1 | 4/2010 | Paulsen et al. |
| 2010/0114775 A1 | 5/2010 | Griffin |
| 2010/0121717 A1 | 5/2010 | Chen |
| 2010/0138294 A1 | 6/2010 | Bussmann et al. |
| 2010/0138344 A1 | 6/2010 | Wong et al. |
| 2010/0145723 A1 | 6/2010 | Hudson et al. |
| 2010/0145778 A1 | 6/2010 | Fordyce, III et al. |
| 2010/0146607 A1 | 6/2010 | Piepenbrink et al. |
| 2010/0156933 A1 | 6/2010 | Jones et al. |
| 2010/0169179 A1 | 7/2010 | Ramer et al. |
| 2010/0190510 A1 | 7/2010 | Maranhas et al. |
| 2010/0191551 A1 | 7/2010 | Drance et al. |
| 2010/0191578 A1 | 7/2010 | Tran et al. |
| 2010/0192230 A1 | 7/2010 | Steeves et al. |
| 2010/0205167 A1 | 8/2010 | Tunstall-Pedoe et al. |
| 2010/0217525 A1 | 8/2010 | King et al. |
| 2010/0223184 A1 | 9/2010 | Perlman |
| 2010/0241495 A1 | 9/2010 | Maniyar et al. |
| 2010/0241496 A1 | 9/2010 | Gupta et al. |
| 2010/0250368 A1 | 9/2010 | Porco |
| 2010/0257054 A1 | 10/2010 | Martin et al. |
| 2010/0260388 A1 | 10/2010 | Garrett et al. |
| 2010/0262449 A1 | 10/2010 | Monteforte et al. |
| 2010/0274655 A1 | 10/2010 | Postrel |
| 2010/0293065 A1 | 11/2010 | Brody et al. |
| 2010/0306099 A1 | 12/2010 | Hirson et al. |
| 2010/0312630 A1 | 12/2010 | Krutchik et al. |
| 2010/0312645 A1 | 12/2010 | Niejadlik et al. |
| 2010/0312646 A1 | 12/2010 | Gupta et al. |
| 2010/0323716 A1 | 12/2010 | Jaffri |
| 2010/0324977 A1 | 12/2010 | Dragt |
| 2010/0332339 A1 | 12/2010 | Patel et al. |
| 2011/0010238 A1 | 1/2011 | Postrel |
| 2011/0015987 A1 | 1/2011 | Chakraborty et al. |
| 2011/0022424 A1 | 1/2011 | VonDerheide |
| 2011/0022483 A1 | 1/2011 | Hammad |
| 2011/0022517 A1 | 1/2011 | Hammad |
| 2011/0029403 A1 | 2/2011 | Xu |
| 2011/0053559 A1 | 3/2011 | Klein |
| 2011/0055005 A1 | 3/2011 | Lang |
| 2011/0057027 A1 | 3/2011 | Grossman et al. |
| 2011/0060640 A1 | 3/2011 | Thompson et al. |
| 2011/0065419 A1 | 3/2011 | Book et al. |
| 2011/0082735 A1 | 4/2011 | Kannan et al. |
| 2011/0087430 A1 | 4/2011 | Boss et al. |
| 2011/0093318 A1 | 4/2011 | Guday et al. |
| 2011/0106613 A1 | 5/2011 | Felt et al. |
| 2011/0112892 A1 | 5/2011 | Tarantino |
| 2011/0131627 A1 | 6/2011 | Abendroth et al. |
| 2011/0137804 A1 | 6/2011 | Peterson |
| 2011/0140841 A1 | 6/2011 | Bona et al. |
| 2011/0184793 A1 | 7/2011 | Bohannon et al. |
| 2011/0189981 A1 | 8/2011 | Faith et al. |
| 2011/0191152 A1 | 8/2011 | Schwartz |
| 2011/0191161 A1 | 8/2011 | Dai |
| 2011/0191237 A1 | 8/2011 | Faith et al. |
| 2011/0202416 A1 | 8/2011 | Buer et al. |
| 2011/0238476 A1 | 9/2011 | Carr et al. |
| 2011/0238514 A1 | 9/2011 | Ramalingam et al. |
| 2011/0238517 A1 | 9/2011 | Ramalingam et al. |
| 2011/0270618 A1 | 11/2011 | Banerjee et al. |
| 2011/0289004 A1 | 11/2011 | Prakash et al. |
| 2011/0302016 A1 | 12/2011 | Haddad |
| 2012/0010931 A1 | 1/2012 | Mehra et al. |
| 2012/0010938 A1 | 1/2012 | Standley et al. |
| 2012/0185317 A1 | 7/2012 | Wong |
| 2012/0259722 A1 | 10/2012 | Mikurak |
| 2012/0323703 A1 | 12/2012 | Hillier |

FOREIGN PATENT DOCUMENTS

| | | |
|---|---|---|
| JP | 2001357337 A | 12/2001 |
| JP | 2002099971 | 4/2002 |
| JP | 2002175354 A | 6/2002 |
| JP | 2002288502 A | 10/2002 |
| JP | 2003022481 A | 1/2003 |
| JP | 2003090730 | 3/2003 |
| JP | 2004264986 | 9/2004 |
| JP | 2004341684 A | 12/2004 |
| JP | 2006164189 | 6/2006 |
| JP | 2007208444 | 8/2007 |
| JP | 2007522564 | 8/2007 |
| JP | 2008022395 | 1/2008 |
| JP | 2008199221 | 8/2008 |
| JP | 2009020036 | 1/2009 |
| JP | 2009205684 | 9/2009 |
| JP | 2009224868 | 10/2009 |
| JP | 2009538093 | 10/2009 |
| JP | 2009282618 | 12/2009 |
| JP | 2009283989 | 12/2009 |
| JP | 2011188256 | 9/2011 |
| JP | 2012510681 | 5/2012 |
| JP | 2012529085 | 11/2012 |
| KR | 1020070105106 | 10/2007 |
| KR | 20090080000 | 7/2009 |
| KR | 20090104068 | 10/2009 |
| WO | 2008067543 | 6/2008 |
| WO | WO2010065235 | 6/2010 |
| WO | WO2010138891 | 12/2010 |

OTHER PUBLICATIONS

U.S. Appl. No. 12/820,816, filed Jun. 22, 2010, Harsha Ramalingam et al., "Mobile Device Security".

U.S. Appl. No. 12/976,533, filed Dec. 22, 2010, Harsha Ramalingam, "Mobile Payments Using Point-of-sale Infrastructure".

U.S. Appl. No. 13/027,913, filed Feb. 15, 2011, Harsha Ramalingam, et al., "User Profile and Geolocation for Efficient Transactions".

U.S. Appl. No. 13/052,930, filed Mar. 21, 2011, Hart et al., "Advertisement Service".

U.S. Appl. No. 13/371,038, filed Feb. 10, 2012, Harsha Ramalingam et al., "User Profile and Geolocation for Efficient Transactions".

Alqerem et al., "Location Dependent Transaction for Mobile Environment", International Conference on Information and Communication Technologies: From Theory to Applications, Piscataway, NJ, 2006, 2 pages.

Canadian Office Action mailed Aug. 29, 2014 for Canadian patent application No. 2794085, a counterpart foreign application of U.S. Appl. No. 12/820,672, 3 pages.

Canadian Office Action mailed Apr. 7, 2015 for Canadian patent application No. , a counterpart foreign application of U.S. Appl. No. 13/052,930, 5 pages.

Chinese Office Action mailed Mar. 10, 2015 for Chinese patent application No. 201180015579.3, a counterpart foreign application of U.S. Appl. No. 12/820,672, 11 pages.

Collins, "Smartphones to be used as Hotel Room Keys", Telegraph Media Group Limited, May 25, 2010, Retrieved on Jun. 2, 2010 at <<http://www.telegraph.co.uk/travel/hotels/7762522/Smartphones-to-be-used-as-hotel-room-keys.html>> pp. 1-2.

Definition: Purchase, retrieved on Mar. 31, 2014 at <<dictionary.reference.com/browse/purchase?s=t>>, World English Dictionary, 2009, 2 pages.

Deleon, "Holiday Inn to Trial Mobile-as-room-key Program Next Month", TechCrunch, May 25, 2010, Retrieved on Jun. 2, 2010 at <<http://www.mobilecrunch.com/2010/05/25/holiday-inn-to-trial-mobile-as-room-key-program-next-month/>> 1 pg.

(56) References Cited

OTHER PUBLICATIONS

Dictionary.com, "Broadcast", retrived at <<http://dictionary.reference.com/browse/broadcast>> on Feb. 6, 2012, 4 pages.
Extended European Search Report mailed Oct. 31, 2014 for European Patent Application No. 12760316.5, 7 pages.
Extended European Search Report mailed Feb. 26, 2014 for European patent application No. 11759940.7, 11 pages.
Final Office Action for U.S. Appl. No. 12/820,949, mailed on Jan. 6, 2014, Harsha Ramalingam, "Transaction Tracking and Incentives", 22 pages.
Final Office Action for U.S. Appl. No. 12/820,854, mailed on Oct. 22, 2013, Harsha Ramalingam, "Location-Based Marketing to Mobile Devices", 21 pages.
Final Office Action for U.S. Appl. No. 12/820,705, mailed on Dec. 5, 2013, Harsha Ramalingam, "Transaction Completion Based on Geolocation Arrival", 14 pages.
Final Office Action for U.S. Appl. No. 12/820,913, mailed on Apr. 24, 2015, Harsha Ramalingam, "Transaction Bootstrapping to Create Relationships", 12 pages.
Translated Japanese Office Action mailed Mar. 31, 2015 for Japanese patent application No. 2015-047434, a counterpart foreign application of U.S. Appl. No. 12/820,672, 9 pages.
Translated Japanese Office Action mailed Dec. 10, 2013 for Japanese patent application No. 2013-500205, a counterpart foreign application of U.S. Pat. No. 8,140,403, 9 pages.
Translated Japanese Office Action mailed Jul. 1, 2014 for Japanese patent application No. 2014-094659, a counterpart foreign application of U.S. Pat. No. 8,140,403, 4 pages.
Translated Japanese Office Action mailed Jul. 29, 2014 for Japanese patent application No. 2013-553675, a counterpart foreign application of U.S. Appl. No. 13/052,930, 9 pages.
Translated Korean Office Action mailed Jan. 28, 2015 for Korean patent application No. 10-2014-7035474, a counterpat foreign of U.S. Appl. No. 12/820,672, 11 pages.
Translated Korean Office Action mailed Apr. 24, 2015 for Korean patent application No. 10-2012-7024786, a counterpart foreign application of U.S. Appl. No. 12/820,672, 9 pages.
Translated Korean Office Action mailed Oct. 17, 2014 for Korean patent application No. 10-2012-7024786, a counterpart foreign application of U.S. Appl. No. 12/520,672, 11 pages.
"MGM Grand, MacroView Labs—Mobile App Developers for iPhone, Android, Blackberries", retrieved on Jan. 13, 2011 at <<http://www.macroviewlabs.com/mgmgrand>>, 5 pages.
Non-Final Office Action for U.S. Appl. No. 13/052,930, mailed on Jan. 2, 2013, Gregory M. Hart et al., "Advertisement Service", 19 pages.
Office Action for U.S. Appl. No. 13/111,920, mailed on Oct. 2, 2013, Andrew J. Doane, "Location-Based Mobile Advertising", 28 pages.
Office Action for U.S. Appl. No. 12/820,854, mailed on Nov. 5, 2014, Harsha Ramalingam, "Location-Based Marketing to Mobile Devices" , 23 pages.
Office action for U.S. Appl. No. 12/820,949, mailed on Nov. 9, 2012, Ramalingam et al, "Transaction Tracking and Incentives", 11 pages.
Office Action for U.S. Appl. No. 12/894,287, mailed on Dec. 4, 2014, Michael Carr, "Location-based Coupons and Mobile Devices", 24 pages.
Office action for U.S. Appl. No. 12/894,323, mailed on Dec. 12, 2012, Carr et al., "Converged Web-identity and Mobile Device Based Shopping", 9 pages.
Office Action for U.S. Appl. No. 13/052,930, mailed on Dec. 16, 2013, Gregory M. Hart, "Advertisement Service", 28 pages.
Office action for U.S. Appl. No. 12/820,743, mailed on Dec. 27, 2013, Ramalingam et al., "Hierarchical Device Relationships for Geolocation-Based Transactions", 26 pages.
Non-Final Office Action for U.S. Appl. No. 12/820,816, mailed on Dec. 31, 2012, Harsha Ramalingham et al., "Mobile Device Security", 10 pages.
Office Action for U.S. Appl. No. 12/820,913, mailed on Dec. 4, 2013, Harsha Ramalingam, "Transaction Bootstrapping to Create Relationships", 24 pages.

Non-Final Office Action for U.S. Appl. No. 12/894,287, mailed on Dec. 5, 2012, Michael Carr et al., "Location-based Coupons and Mobile Devices", 8 pages.
Non-Final Office Action for U.S. Appl. No. 12/820,705, mailed on Feb. 27, 2012, Harsha Ramalingam et al., "Transaction Completion Based on Geolocation Arrival", 15 pages.
Non-Final Office Aciotn for U.S. Appl. No. 12/820,743, mailed on Feb. 27, 2012, Harsha Ramalingam et al, "Hierarchical Device Relationships for Geolocation-Based Transactions", 18 pages.
Office action for U.S. Appl. No. 12/820,913, mailed on Feb. 28, 2013, Ramalingam et al., "Transaction Bootstrapping to Create Relationships", 19 pages.
Office Action from U.S. Appl. No. 12/894,287, mailed on Mar. 27, 2014, Michael Carr, "Location-based Coupons and Mobile Devices", 17 pages.
Office action for U.S. Appl. No. 12/820,854, mailed on Apr. 10, 2013, Ramalingam et al., "Location-Based Marketing to Mobile Devices", 22 pages.
Final Office Action for U.S. Appl. No. 12/820,743, mailed on Apr. 10, 2014, Harsha Ramalingam, "Hierarchical Device Relationships for Geolocation-Based Transactions", 24 pages.
Office action for U.S. Appl. No. 13/468,714, mailed on Apr. 11, 2013, Ramalingam, "Mobile Payments Using Point-of-sale Infrastructure", 35 pages.
Office action for U.S. Appl. No. 12/976,533, mailed on Apr. 12, 2013, Ramalingam, "Mobile Payments Using Point-of-sale Infrastructure", 57 pages.
Office Action for U.S. Appl. No. 12/820,705, mailed on Apr. 17, 2015, Harsha Ramalingam, "Transaction Completion Based on Geolocation Arrival", 23 pages.
Office Action for U.S. Appl. No. 12/820,705, mailed on Apr. 2, 2014, Harsha Ramalingam, "Transaction Completion Based on Geolocation Arrival", 11 pages.
Office action for U.S. Appl. No. 12/820,743, mailed on Apr. 3, 2015, Ramalingam et al., "Hierarchical Device Relationships for Geolocation-Based Transactions", 21 pages.
Final Office Action for U.S. Appl. No. 12/820,913, mailed on Apr. 9, 2014, Harsha Ramalingam, "Transaction Bootstrapping to Create Relationships", 21 pages.
Final Office Action for U.S. Appl. No. 12/894,287, mailed on Apr. 9, 2015, Michael Carr, "Location-based Coupons and Mobile Devices", 24 pages.
Office Action for U.S. Appl. No. 12/820,854, mailed on May 9, 2014, Harsha Ramalingam, "Location-Based Marketing to Mobile Devices", 25 pages.
Office action for U.S. Appl. No. 12/820,949, mailed on Jul. 20, 2013, Ramalingam et al, "Transaction Tracking and Incentives", 20 pages.
Office action for U.S. Appl. No. 13/111,920, mailed on Jun. 20, 2014, Doane et al., "Location-Based Mobile Advertising", 31 pages.
Final Office Aciotn for U.S. Appl. No. 12/820,743, mailed on Jun. 21, 2012, Harsha Ramalingam et al, "Hierarchical Device Relationships for Geolocation-Based Transactions", 24 pages.
Office action for U.S. Appl. No. 12/894,323, mailed on Jun. 24, 2013, Carr et al., "Converged Web-identity and Mobile Device Based Shopping", 12 pages.
Final Office Action for U.S. Appl. No. 12/820,854, mailed on Jun. 3, 2015, Harsha Ramalingam, "Location-Based Marketing to Mobile Devices", 11 pages.
Office action for U.S. Appl. No. 13/052,930, mailed on Jul. 1, 2014, Hart et al., "Advertisement Service", 29 pages.
Office Action for U.S. Appl. No. 13/052,930, mailed on Jul. 10, 2015, Gregory M. Hart, "Advertisement Service", 30 pages.
Office Action for U.S. Appl. No. 13/111,920, mailed on Jul. 10, 2015, Andrew J. Doane, "Location-Based Mobile Advertising", 29 pages.
Office action for U.S. Appl. No. 12/820,705, mailed on Jul. 12, 2013, Ramalingam et al, "Transaction Completion Based on Geolocation Arrival", 16 pages.
Office action for U.S. Appl. No. 12/894,287, mailed on Jul. 16, 2013, Carr et al., "Location-based Coupons and Mobile Devices", 18 pages.
Office action for U.S. Appl. No. 14/726,380, mailed on Jul. 22, 2015, Carr et al., "Converged Web-Identity and Mobile Device Based Shopping", 12 pages.

(56) References Cited

OTHER PUBLICATIONS

Non-Final Office Action for U.S. Appl. No. 13/371,038, mailed on Jul. 23, 2012, Harsha Ramalingam et al., 8 pages.
Final Office Action for U.S. Appl. No. 12/820,705, mailed on Jul. 25, 2012, Harsha Ramalingam et al., "Transaction Completion Based on Geolocation Arrival", 16 pages.
Non-Final Office Action for U.S. Appl. No. 12/820,854, mailed on Jul. 27, 2012, Harsha Ramalingam et al., "Location-Based Marketing to Mobile Devices", 16 pages.
Office action for U.S. Appl. No. 12/820,743, mailed on Jul. 29, 2015, Ramalingam et al., "Hierarchical Device Relationships for Geolocation-Based Transactions", 9 pages.
Non-Final Office Action for U.S. Appl. No. 12/820,913, mailed on Jul. 31, 2012, Harsha Ramalingam et al. "Transaction Bootstrapping to Create Relationships", 14 pages.
Office action for U.S. Appl. No. 13/052,930, mailed on Jul. 8, 2013, Hart et al., "Advertisement Service", 20 pages.
Non-Final Office Action for U.S. Appl. No. 13/468,714, mailed on Aug. 16, 2012, Harsha Ramalingam, "Mobile Payments Using Point-of-sale Infrastructure", 29 pages.
Non-Final Office Action for U.S. Appl. No. 12/976,533, mailed on Aug. 16, 2012, Harsha Ramalingam, "Mobile Payments Using Point-of-sale Infrastructure", 38 pages.
Office action for U.S. Appl. No. 12/820,913, mailed on Sep. 11, 2014, Ramalingam et al., "Transaction Bootstrapping to Create Relationships", 15 pages.
Office action for U.S. Appl. No. 12/894,323, mailed on Sep. 11, 2014, Carr et al, "Converged Web-identity and Mobile Device Based Shopping", 14 pages.
Office action for U.S. Appl. No. 12/820,705, mailed on Sep. 2, 2014, Ramalingam et al., "Transaction Completion Based on Geolocation Arrival", 12 pages.
PCT Search Report mailed on May 12, 2011 for PCT Application No. PCT/US11/28825.
PCT Search Report for PCT application No. PCT/US12/29798, mailed Jul. 5, 2012 , 7 pages.
"Placecast Raises $3 Million for Location-Based Mobile Marketing Technology", The Good NET Guide, Retrieved on Mar. 25, 2010 at <<http://thegoodnetguide.com/03/placecast-raises-3-million-for-location-based-mobile-marketing-technology/>>, 1 pg.
Prabhu, "Transaction Processing in Mobile Database System", University of Missouri—Kansas City, 2006. vol. 67/12-B of Dissertation Abstracts International, 1 page.
Starbucks Card Mobile App, "Using Your Starbucks Card is Now Even Faster and Easier With the Starbucks Card Mobile App", Retrieved on Apr. 22, 2010 at <<http://www.starbucks.com/coffee-house/mobile-apps/starbucks-card-mobile>>, pp. 1-2.
WebWire, "BooksOnBoard Adds Google Checkout, Offers Discount on Google Checkout Purchases", Jun. 11, 2008, retrived from Google News Apr. 6, 2012, pp. 1-pp. 2.
U.S. Appl. No. 12/820,672, Non-Final Office Action, Mar. 24, 2011, 24 pages.
U.S. Appl. No. 12/820,672, Notice of Allowance, Nov. 7, 2011, 10 pages.
U.S. Appl. No. 12/820,672, Restriction Requirement, Jan. 27, 2011, 9 pages.
U.S. Appl. No. 12/820,705, Final Office Action, Aug. 19, 2015, 15 pages.
U.S. Appl. No. 12/820,705, Non-Final Office Action, Feb. 9, 2016, 13 pages.
U.S. Appl. No. 12/820,705, Restriction Requirement, Feb. 11, 2015, 7 pages.
U.S. Appl. No. 12/820,705, Restriction Requirement, Nov. 22, 2011, 8 pages.
U.S. Appl. No. 12/820,743, Advisory Action, Oct. 7, 2015.
U.S. Appl. No. 12/820,743, Non-Final Office Action, Feb. 1, 2016, 9 pages.
U.S. Appl. No. 12/820,743, Restriction Requirement, Jan. 7, 2015.
U.S. Appl. No. 12/820,743, Restriction Requirement, Nov. 18, 2011.
U.S. Appl. No. 12/820,913, Advisory Action, May 8, 2013.
U.S. Appl. No. 12/820,913, Non-Final Office Action, Sep. 9, 2015, 30 pages.
U.S. Appl. No. 12/820,949, Advisory Action, Apr. 16, 2014, 3 pages.
U.S. Appl. No. 12/820,949, Restriction Requirement, Jul. 31, 2012.
U.S. Appl. No. 12/820,949, filed Jun. 22, 2010, Titled: Transaction Tracking and Incentives.
U.S. Appl. No. 12/894,287, Advisory Action, Dec. 19, 2013, 3 pages.
U.S. Appl. No. 12/894,287, Final Office Action, Feb. 22, 2016, 29 pages.
U.S. Appl. No. 12/894,287, Non-Final Office Action, Sep. 3, 2015, 24 pages.
U.S. Appl. No. 12/894,287, Restriction Requirement, Sep. 25, 2012, 7 pages.
U.S. Appl. No. 12/894,323, Notice of Allowance, Feb. 2, 2015, 14 pages.
U.S. Appl. No. 12/894,323, Restriction Requirement, Sep. 25, 2012, 7 pages.
U.S. Appl. No. 12/976,533, Non-Final Office Action, Sep. 23, 2015, 39 pages.
U.S. Appl. No. 13/027,913, Non-Final Office Action, Mar. 29, 2011, 25 pages.
U.S. Appl. No. 13/027,913, Notice of Allowance, Nov. 7, 2011, 21 pages.
U.S. Appl. No. 13/371,038, Notice of Allowance, Oct. 11, 2012, 9 pages.
U.S. Appl. No. 13/371,038, Restriction Requirement, Apr. 6, 2012, 7 pages.
U.S. Appl. No. 13/468,714, Non-Final Office Action, Aug. 31, 2015, 36 pages.
U.S. Appl. No. 13/468,714, Final Office Action, Feb. 25, 2016, 14 pages.
U.S. Appl. No. 13/725,466, Non-Final Office Action, Oct. 5, 2015, 20 pages.
U.S. Appl. No. 13/973,870, Corrected Notice of Allowability, May 20, 2015, 7 pages.
U.S. Appl. No. 13/973,870, Notice of Allowance, Apr. 3, 2015, 11 pages.
U.S. Appl. No. 14/726,380, Restriction Requirement, Dec. 9, 2015, 7 pages.
CA2,794,085, Office Action, Aug. 27, 2015, 4 pages.
CN201180015579.3, Office Action, Oct. 16, 2015, 13 pages.
JP2015-047434, Notice of Allowance, Dec. 15, 2015, 6 pages.
KR10-2014-7035474, Office Action, Oct. 29, 2015, 3 pages.
KR10-2015-7033998, Office Action, Jan. 6, 2016, 6 pages.
U.S. Appl. No. 12/820,913, Final Office Action, Mar. 4, 2016, 42 pages.
U.S. Appl. No. 13/725,466, Final Office Action, Mar. 16, 2016, 28 pages.
U.S. Appl. No. 14/726,380, Final Office Action, Apr. 15, 2016, 36 pages.
CA2,830,268, Office Action, Mar. 30, 2016, 5 pages.

* cited by examiner

MOBILE DEVICE SECURITY

CROSS REFERENCE TO RELATED APPLICATIONS

This application is a continuation of U.S. patent application Ser. No. 13/973,870, entitled "Mobile Device Security," filed on Aug. 22, 2013, now U.S. Pat. No. 9,107,064, which is a continuation of U.S. patent application Ser. No. 12/820,816, entitled "Mobile Device Security," filed on Jun. 22, 2010, now U.S. Pat. No. 8,521,131, which claims the benefit of U.S. Provisional Application Nos. 61/316,527 filed on Mar. 23, 2010 and 61/351,743 filed on Jun. 4, 2010, all of which are incorporated by reference herein in their entirety.

BACKGROUND

The widespread use of mobile phones and the increasing sophistication of smart phones have created societies in which personal, mobile computing power has become nearly ubiquitous. Content for mobile computing devices has typically flowed from technology initially used with desktop computers. Some aspects of mobile computing devices, such as a small form factor with limited display capabilities and a lack of full-size keyboards, hinder adoption of content originally designed for desktop computers. Other aspects, such as the mobility itself, provide unique opportunities to use mobile computing devices in ways very different than the ways people use desktop computers. Development of content that recognizes the limitations while taking full advantage of the unique aspects of mobile computing devices is still an active and maturing field.

Consumers are also becoming increasingly comfortable with virtual interactions, such as online shopping. However, in spite of the relative convenience of the virtual world, as opposed to the brick-and-mortar world, friction and security concerns still limit adoption of virtual interactions. For example, remembering passwords and maintaining multiple accounts create friction in virtual-world interactions. Additionally, the anonymity and lack of direct interaction between the consumer and the merchant create potential security problems. Accordingly, content designed specifically for mobile computing devices that eliminates the friction of transactions and addresses securities concerns will have great value for consumers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
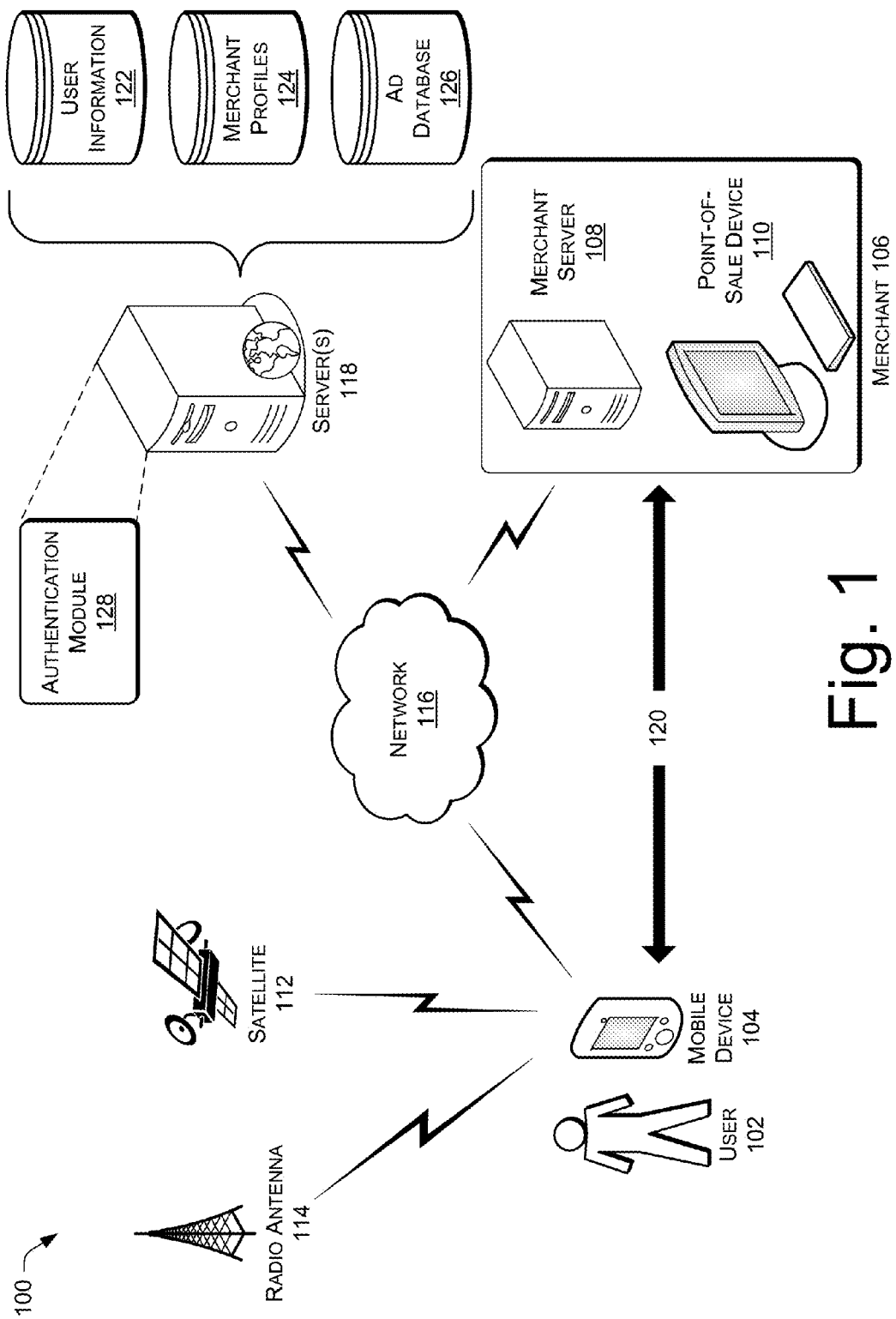
FIG. 1 shows an illustrative architecture for facilitating efficient transactions between a user of a mobile device and a merchant based on the geolocation of the mobile device.

Many activities are defined in whole or part by the location at which those activities occur. In some instances, the activity can be inferred with a high likelihood of accuracy based on the location alone. For example, a car at a tollbooth likely there to pay the toll and pass through, a person waiting by a boarding gate for an airplane is likely a ticket holder for the flight, a person with a reservation at a hotel is likely going to check in to the hotel when he or she arrives in the lobby. At some locations many types of activities may be probable, but there are certain activities that will only happen at those locations. For example, many things may happen at the entry to a house, but arming or disarming a home security system will only be done at that location. A mobile computing device that is location-aware and can predict or infer what a user may be doing at that location will be able to automate some activities and provide a high level of user convenience.

This disclosure is directed to, in part, facilitating transactions based on geolocation and unique user identification. For instance, these transactions may include electronic commerce transactions or any other type of transaction. Innovations in electronic commerce, such as a one-click shopping cart, have made the "Internet shopping" experience smoother and have reduced friction perceived by the user. For instance, clicking a single button to complete a purchase requires fewer steps than entering a password, address, credit card number, and such. The reduction of steps, clicks, and the like reduces the friction in a transaction. Commerce in the brick-and-mortar world causes the consumer even more friction than transactions in the electronic commerce world in some instances. For example, describing the item one wishes to purchase, presenting payment to a cashier, waiting for the cashier to process the payment, and eventually receiving the desired item is an example of a typical, and relatively high-friction, brick-and-mortar transaction.

Access to the World Wide Web from mobile devices provides a platform for electronic commerce similar to Internet shopping from a desktop computer. Mobile computing devices, such as mobile phones, are often carried with users throughout their daily interactions in the brick-and-mortar world. Many of these mobile computing devices are equipped with Global Positioning System (GPS) functionality to determine a location of the device, and thus, a location of the corresponding user. This disclosure combines the location awareness of mobile devices with the relatively lower friction transactions of electronic commerce to create a friction-free or, in some instances, a "zero-click" solution for interactions between consumers and merchants in the brick-and-mortar world. Unique user identification provides a thread that ties together information about a particular user (e.g., credit card data), a link between that user and a given mobile computing device, and the relationship that user wishes to have with a given merchant (e.g., opt in to zero-click purchasing).

A merchant may include any human or legal person such as, but not limited to, sellers of goods or services that engages in transactions with customers. For example, a government may be a merchant in the context of providing government services, privileges, and/or rights.

The described techniques for low-friction or friction-free transactions may be implemented in a number of ways and in a number of contexts. Example implementations and context are provided with reference to the following figures, as described below in more detail. It is to be appreciated, however, that the following implementations and contexts illustrative of many possible implementations and contexts Illustrative Environment and System Architecture FIG. 1 shows an illustrative architecture 100 in which a representative user 102 employs a mobile device 104 to interact with a merchant 106. The merchant 106 may comprise a point-of-sale device 110 (e.g., a "cash register") and a merchant server 108. In some implementations, there may be one merchant server 108 for several point-of-sale devices 110. The merchant server 108 may also include merchant applications that manage interactions between the merchant 106 and the mobile device 104. The merchant applications may include applications that regulate point-of-sale transactions, online transactions, the provisioning of advertisements, promotions, information, and the like. The merchant server 108 may also store customer information about past or potential future customers. In some implementations, the customer information may comprise information such as personal information about the customer, customer preferences, and the like.

The mobile device 104 may be implemented as any number of mobile devices, including but not limited to a mobile phone, a personal digital assistant (PDA), a laptop computer, a net book, an eBook reader, a personal media player (PMP), a portable gaming system, an automobile navigation system, and so forth. The device 104 is location aware, or is able to provide information to another entity (e.g., a server) to allow the other entity to determine a location of the device 104. A location on the surface of the earth, or a "geolocation," may be provided to the device by a satellite 112 such as a GPS satellite. Alternatively, wireless signals such as from a radio antenna 114 may be used to determine a geolocation of the device 104 relative to a known position of the radio antenna 114. Other technologies and methods for determining geolocation are also envisioned within the scope of this disclosure such as, for example, calculating geolocation based on a network access point (e.g., WiFi hotspot) or from a locator signal broadcast from a known location, such as at the merchant 106.

The device 104 and the merchant 106 may connect to a network 116. The network 116 may include any one or combination of multiple different types of networks, such as cable networks, local area networks, personal area networks, wide area networks, the Internet, wireless networks, ad hoc networks, mesh networks, and/or the like. In some implementations the satellite 112 and/or the radio antenna 114 may provide network connectivity to the mobile device 104 as well as provide geolocation. For example, the radio antenna 114 may provide network access to the mobile device 104 according to the International Mobile Telecommunications-2000 standards ("3G network") or the International Mobile Telecommunications Advanced standards ("4G network"). Other implementations may include one source of geolocation data such as the satellite 112 and a separate source of network connectivity such as a WiFi hotspot. The merchant 106 may connect to the network 116 through the merchant server 108 using any suitable mechanism such as a wired or wireless connection.

A one or more servers 118 may also be connected to the network 116 and configured to manage interaction between the mobile device 104 and the merchant 106. In some implementations, all or part of the interaction between the mobile device 104 and the merchant 106 may be through a direct communications link 120 without passing through the server 118 or the network 116. The direct communication link 120 may be implemented by radio transmissions (e.g., IEEE 802.11, Bluetooth), infrared signals, radio frequency identification (RFID), magnetism (e.g., magnetic strips such as used on credit cards), display of a code on the device 104 to a human operator or to a scanning device at the merchant 106, and/or any other method of directly passing information between the mobile device 104 and the merchant 106.

The server(s) 118 may house or otherwise have a connection to multiple data stores including user information 122, merchant profiles 124, an advertisement ("ad") database 126, and/or other data stores. Generally, the user information 122 contains information about the user 102 associated with the mobile device 104. The user information 122 enables efficient and personalized interaction between the user 102 and the merchant 106. The merchant profiles 124 generally contain information about one or more merchants including the merchant 106 with which the user 102 is interacting. One type of interaction between the merchant 106 and the user 102 is advertising provided from the merchant 106 to the device 104. Information for generating relevant advertisements may be contained in the advertisement database 126. Each of the data stores will be discussed in greater detail below.

The server(s) 118 may also comprise an authentication module 128 that compares login information from the mobile device 104 and/or the merchant 106 to confirm that the correct user information 122, merchant profiles 124, advertisement database 126, and other information is correctly correlated with the right entity (e.g., user 102 and/or point-of-sale device 110). The authentication module 128 will be discussed in greater detail below.

Illustrative Mobile Device

Figure 2:
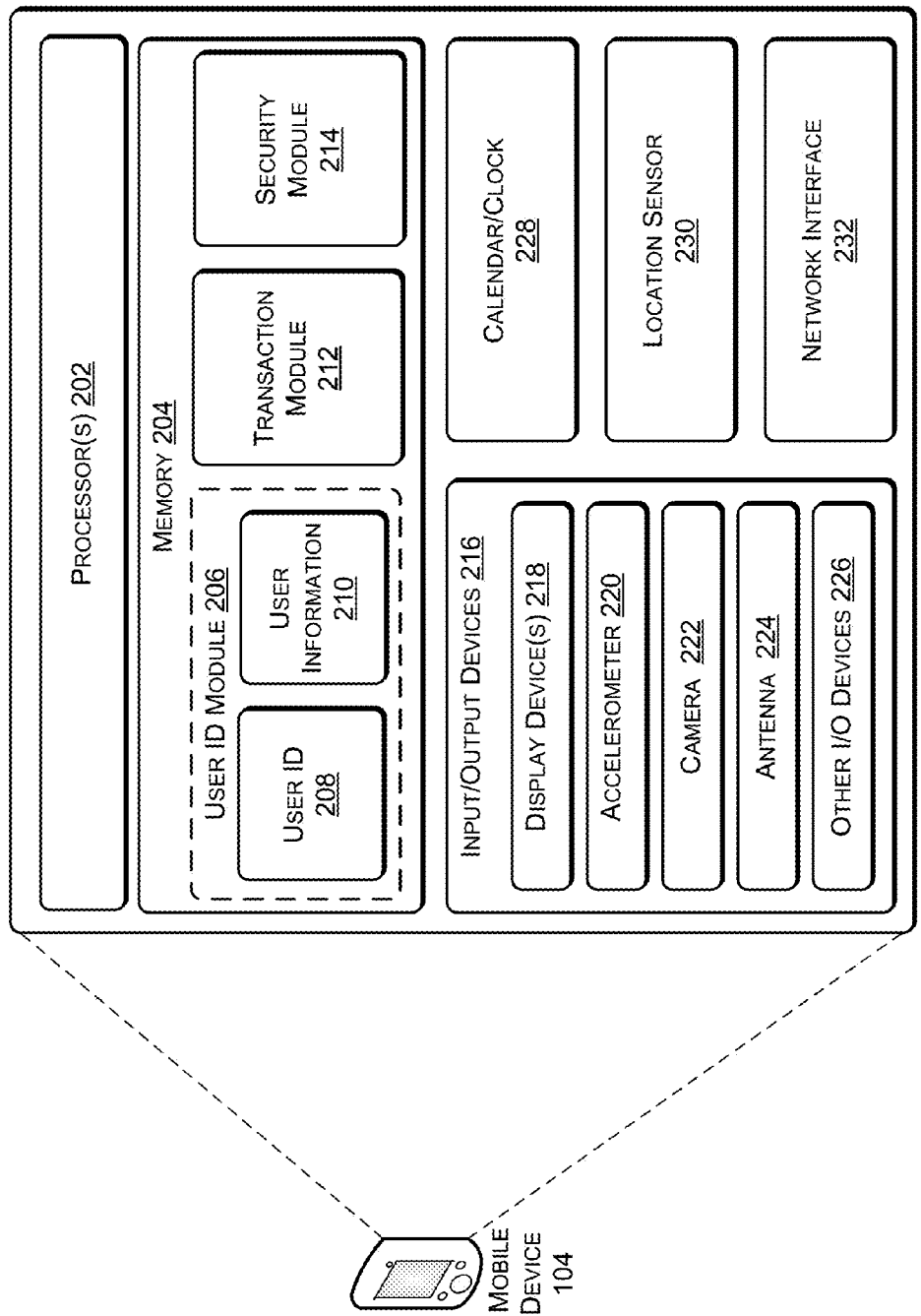
FIG. 2 shows the mobile device from FIG. 1 in greater detail.

FIG. 2 is a schematic representation of the mobile device 104 of FIG. 1. The mobile device 104 includes one or more processors 202 and a memory 204. The memory may contain a user identification module 206 that in turn contains a user identifier 208, user information 210, a transaction module 212, and a security module 214. The user identification 208 may be a unique number or code that uniquely identifies the user 102 of the mobile device 104. This user identification 208 may be the same user identification 208 that the user 102 uses for interacting with online merchants and the like. In some implementations, the user identification 208 may be entered by the user 102 into the mobile device 104 during a setup procedure such as by entering a user name and a password. In other implementations, the user identification 208 may be included in hardware of the mobile device 104. For example, a unique serial number of the mobile device 104 may be linked with a user name and password when the user 102 purchases the device 104. As a further example, a subscriber identification module (SIM) on a removable SIM card within the device 104 may contain the user identification 208. In this example, the user identification 208 may be transferred between devices by moving the SIM card.

The device 104 may also contain user information 210 stored locally in the memory 204. This information may be configurable by the user 102 and can include payment information, a home location, and/or map of the device's 104 past movements, past transaction histories, and/or any other information related to the user 102.

The transaction module 212 may recognize when the mobile device 104 is located at a merchant location and, in response, may facilitate a transaction with the merchant 106. The transaction may be based in part on the user information 210. The transaction module 212 may be configured with appropriate application programming interfaces (APIs) to establish a standard communication protocol for receiving information from the merchant 106 (e.g., merchant name and requested payment) and providing corresponding information about the user 102 (e.g., payment information and user identification 208). In some implementations, the transaction module 212 is a software application that a user 102 may install on his or her device 104 such as by downloading from a website. In other implementations, the transaction module 212 may be preinstalled by a manufacturer or retailer of the mobile device 104 and/or built into the mobile device 104 as a type of firmware or hardware. The transaction module 212 coordinates the user identification 208, user information 210, geolocation, and the like to facilitate transactions between the user 102 and the merchant 106.

Given the ability of the mobile device 104 to serve as a platform for zero-click purchases, there is a need to provide security in order to prevent unauthorized charges. The security module 214 addresses this need by limiting functionality of the mobile device 104 and initiating security events in appropriate circumstances. The security module 214 may process login information, such as passwords and/or biometric information to authenticate the user 102 and prevent other people from using the mobile device 104. The security module 214 may also analyze behavior such as purchasing patterns and/or movement patterns and infer that irregular behavior may indicate fraudulent or unauthorized activity and limit device functionality accordingly, as described below in greater detail.

Mobile device 104 also includes one or more input and output devices 216. The output devices may comprise one or more display devices 218 including touch-screen displays that also function as an input device. An accelerometer 220 detects rotation or vibration of the mobile device 104. The accelerometer 220 may be a convenient mechanism for the user 102 to communicate an input to the mobile device 104 by slapping, shaking, twisting, and/or by making a motion that can be detected by the accelerometer 220. The mobile device 104 may also include a camera 222 capable of taking still or video pictures. An antenna 224 in the mobile device 104 may send and receive wireless signals from sources such as the radio antenna 114 and satellite 112. The device 104 may further comprise other input/output devices 226, such as a microphone and a speaker used, for example, in an implementation in which the mobile device 104 functions as a telephone.

In some implementations, the mobile device 104 may also include a calendar/clock 228, a location sensor 230, and a network interface 232. The calendar/clock 228 may calculate time, date, and other data that can be derived from time data and date data. In some implementations, the calendar/clock 228 may communicate with the location sensor 230 to determine, for example, day length at the current location of the device 104 based on the date. This could enable the device 104 to determine whether it is daytime or nighttime based on the time, date, and geolocation.

The calendar/clock 228 and the location sensor 230 may also communicate to create a log of where the device 104 is located at numerous time points. The log of time-place data may be compiled into a map that shows movements of the device overtime and throughout different dates. This map may be stored in the memory 204, for example as a part of the user information 210. The location sensor 230 includes any sort of system that informs the mobile device 104 of its geolocation including, but not limited to, the Global Positioning System of satellites circling the Earth. Alternatively, the location sensor may determine geolocation by radio signal triangulation (e.g., triangulation based on radio antenna signal strength).

The network interface 232 may be configured for wirelessly communicating with the network 116. The network interface 232 may use any standard protocols for network communication. The network interface 232 may be capable of high speed, wireless network communication. In some implementations, the network interface 232 may use the antenna 224 to send and receive data from the network 116. In further implementations, a network interface 232 may provide information to the location sensor 230 (e.g., a closest network access point) from which the location sensor 230 can infer or calculate a location of the mobile device 104.

Illustrative Server

Figure 3:
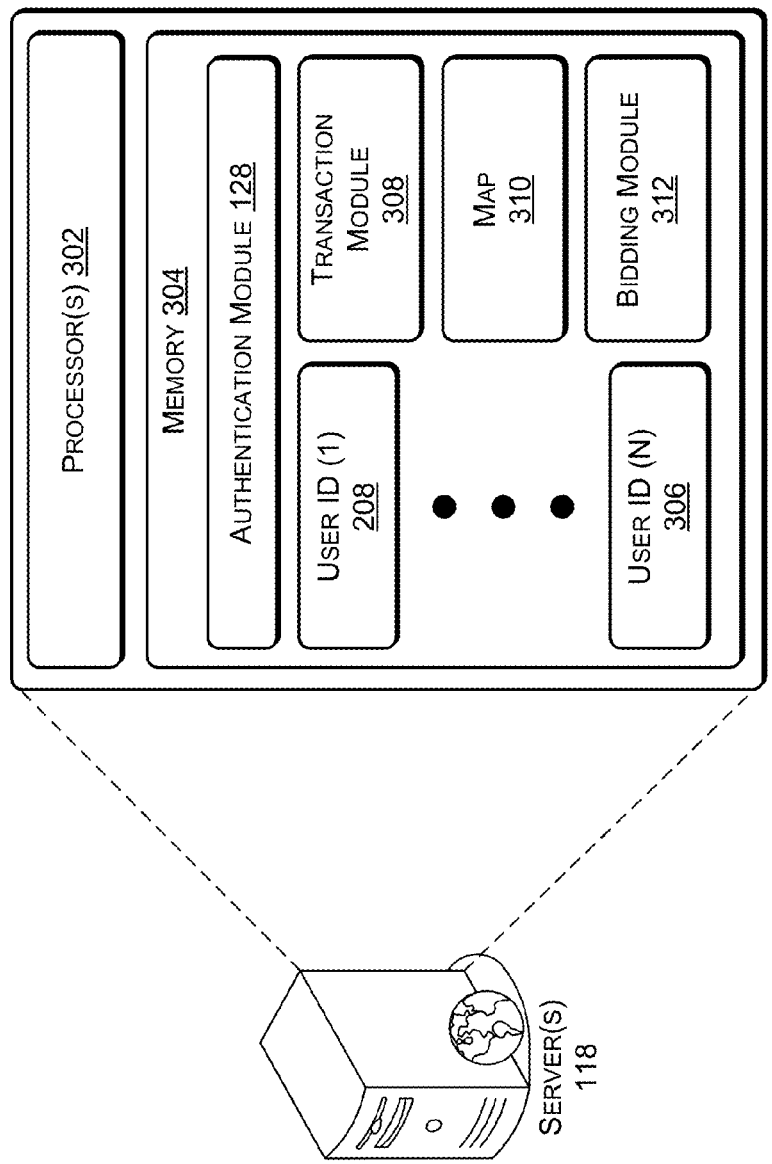
FIG. 3 shows the server(s) from FIG. 1 in greater detail.

FIG. 3 is a schematic representation of the server(s) 118 of FIG. 1. The one or more servers 118 may be implemented as a single computing device, a server farm comprising multiple servers, a distributed network, a cloud-computing configuration, and/or the like. The server(s) 118 comprises one or more processors 302 and a memory 304. The memory 304 may contain the same user identifier (1) 208 associated with the mobile device 104 FIG. 2. In some implementations, memory 304 may contain thousands or even millions of separate user identifiers represented here as User ID (N) 306 where N is any number greater than one. Each user identifier may be associated with a respective mobile device.

The user identifier 208 represents a user 104 that is interacting with the server(s) 118 via a mobile device 104. The authentication module 128 determines if communications coming from the mobile device 104 should be associated with the user identifier 208. In some implementations, authorization may involve handshaking or other verification between, for example, the authentication module 128 of the server(s) 118 and the security module 214 of the mobile device 104. The authentication module 128 may similarly authenticate the identity of merchants 106. Providing robust data security may avoid fraudulent transactions from both mobile devices 104 and merchants 106.

The server(s) 118 may also include a transaction module 308. In some implementations, the transaction module 308 on the server(s) 118 is similar to the transaction module 212 on the mobile device 104. Transactions between the user 102 and the merchant 106 may be facilitated by either or both of the transaction modules 212 and 308 when a geolocation of the device matches or is within a threshold distance of a geolocation of the merchant. The transaction module 308 may be configured with APIs for exchanging information with both the merchant 106 and the mobile device 104. In some implementations, the APIs exposed to the merchant 106 may be regulated to prevent unauthorized merchants from access in the system and to improve data security. The APIs exposed to the mobile device 104 may be generic or customized to specific device hardware and operating systems. Providing multiple sets of APIs may allow the server(s) 118 to translate communications between mobile devices 104 and merchants 106 that would otherwise not be able to exchange information.

A map 310 stored on the server(s) 118 may contain geolocations of merchants 106. Correlation between a particular merchant 106 and a particular geolocation may be used to infer that a mobile device 104 is located at or near a merchant 106 because the mobile device is located at or near a geolocation associated with that merchant 106 in the map 310. The map 310 may also contain real-time information about the geolocations of each of the mobile devices 104 associated with the respective user identifiers 208-306. From this information it may be possible to determine how many mobile devices 104 that belong to the system are present at a given merchant location. It may also be possible to identify other mobile devices 104 in proximity to a given mobile device 104. For example, the map 310 may show that a user's friend (or at least the friend's mobile device) is at the merchant next door.

The server(s) 118 may also facilitate advertising via advertisements sent from or on behalf of the merchant 106 to the mobile device 104. In some instances, the bidding module 312 may receive and process bids for the privilege to place advertisements on mobile devices 104. Users 102 may opt in to receive advertising and be presented with relevant advertisements based on a geolocation of the mobile device 104 and user information 122. The bidding may be structured according to any known bidding system or otherwise. The operator of the server 118 may structure the bidding so as to maximize advertising revenue paid by the merchants 106.

Figure 4:
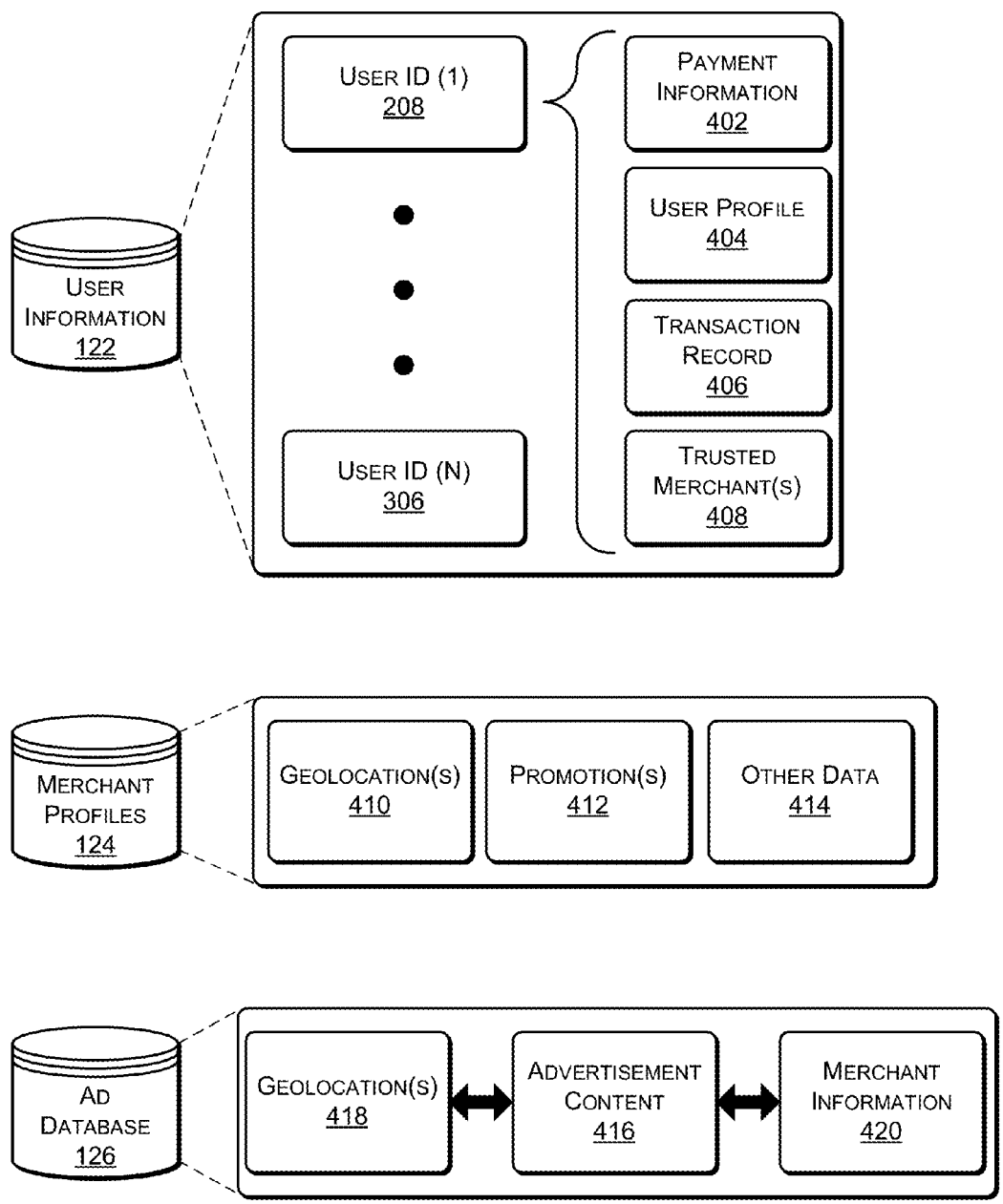
FIG. 4 shows the user information, merchant profiles, and advertisement database from FIG. 1 in greater detail.

FIG. 4 shows multiple data stores including user information 122, merchant profiles 124, and an advertisement database 126 that may be included within or connected to the server(s) 118. The user information 122 may contain some or all of the same information stored as user information 210 on the mobile device 104. In some implementations, the user information 122 stored on the server(s) 118 may be used to backup or restore the user information 210 on the mobile device 104 if, for example, the mobile device 104 is lost or damaged. The user information 122 may provide separate data associated with each of the user identifiers 208-306 shown in FIG. 2. For example, User ID (1) 208 may be associated with payment information 402, a user profile 404, a transaction record 406, and a list of trusted merchants 408. The payment information 402 may include such things as credit card or debit card numbers, bank account information, electronic payment system information, and/or the like. The user profile 404 may contain user preferences, lists of interests and hobbies, indications of which types of communications and/or transactions the user 102 has selected to receive, personal information such as preferences for a matchmaking service, and any other type of information associated with the user 102 and his or her User ID (1) 208. The transaction record 406 may contain a list of past transaction history comprising the merchant, time, geolocation, and subject of the transaction.

Out of all the merchants participating in the system the user 102 may select some subset of those merchants as trusted merchants 408. In some implementations, whenever a user conducts a transaction with a merchant the user may be asked if he or she wishes to add that merchant to the list of trusted merchants. This status as a trusted merchant may be part of the user information 122. The status as a trusted merchant may enable the merchant 106 to engage in transactions with the user 102 via the user's mobile device 104. The status as a trusted merchant may also decrease the amount of interaction required from the user 102 to complete electronic transaction using the mobile device 104 as compared with other merchants that are not included on the trusted merchant list. Within the list of trusted merchants 408 different merchants may be given different trust levels by the user 102. For example, transactions with the most trusted merchants may be completed automatically merely by the user 102 (and the mobile device 104) entering a location of the merchant 106. For other merchants 106 with whom the user 102 does not desire such use of "zero-click" transactions, the user 102 may indicate a lower level of trust that requires some minimal interaction between the user 102 and the mobile device 104 in order to complete a transaction. This may be thought of as a "one-click" interaction, although the specific interaction may be something other than a "click." For other merchants that the user 102 associates with an even lower level of trust, the user 102 may require more than one click such as entry of a password and login before the mobile device 104 is enabled to complete a transaction with the merchant 106.

The merchant profiles 124 contain information about the merchants such as geolocations 410 of the merchants' brick-and-mortar locations, promotions 412 offered by the merchant, and other data 414 about the merchant which may be used to facilitate transactions with mobile devices 104 (e.g., types of credit cards are accepted). The geolocations 410 may be one source of data used to create the map 310 stored on the server(s) 118. The promotions 412 may include things such as coupons or discounts for goods or services offered by the merchant. The promotions 412 may, for example, give a discount to a user 102 who has designated the merchant as a trusted merchant. As a further example, a merchant may provide a coupon to a user 102 of a mobile device 104 when the user enters a competitor's store.

Communication between merchants and mobile devices 104 may also include advertising. The mobile device 104 may have a user interface with a designated window or advertisement box for displaying advertisements sent from merchants 106. The advertisement database 126 stores advertisement content 416 in association with geolocations 418 and merchant information 420. Because the advertisements are targeted for mobile devices 104 which may include a location sensor 230, the advertisement content 416 is associated with one or more geolocations 418 in order to provide location-relevant advertisements. For example, advertisements for a merchant may appear when the user 102 carrying the mobile device 104 approaches the geolocations of one of the merchant's retail stores. For instance, when a user approaches a coffee shop, that coffee shop may serve an advertisement or a promotion for a discounted cup of coffee when the user is near to or is within the coffee shop.

The advertisement content 416 may appear when the mobile device 104 is a predetermined distance from the merchant. In some implementations, the predetermined distance may depend upon a speed at which the mobile device 104 is traveling so that someone traveling in a moving car may receive the advertisement content 416 at a greater distance from the merchant then someone walking In some implementations, the display of advertisements may be deactivated based on the speed at which the mobile device 104 is moving. This feature could prevent distractions to drivers by blocking advertisements, or at least placing the mobile device into a silent mode, when the speed of the mobile device 104 exceeds a speed threshold. The merchant information 420 may designate the merchant supplying the advertisement content 416. This may be used in conjunction with the user profile 404 of a user 102 to provide advertisements from merchants from which that user 102 has expressed an interest (explicitly or implicitly), while refraining from providing advertisements from other merchants. The merchant information 420 may also contain a bid amount indicating a maximum amount that the merchant is willing to bid in order to "win" and display their advertisement on the user's mobile device. This bid amount may be used by the bidding module 312 to determine which advertisement content 416 is displayed on a given mobile device 104.

Illustrative Transactions between a Merchant and a Mobile Device

Figure 5:
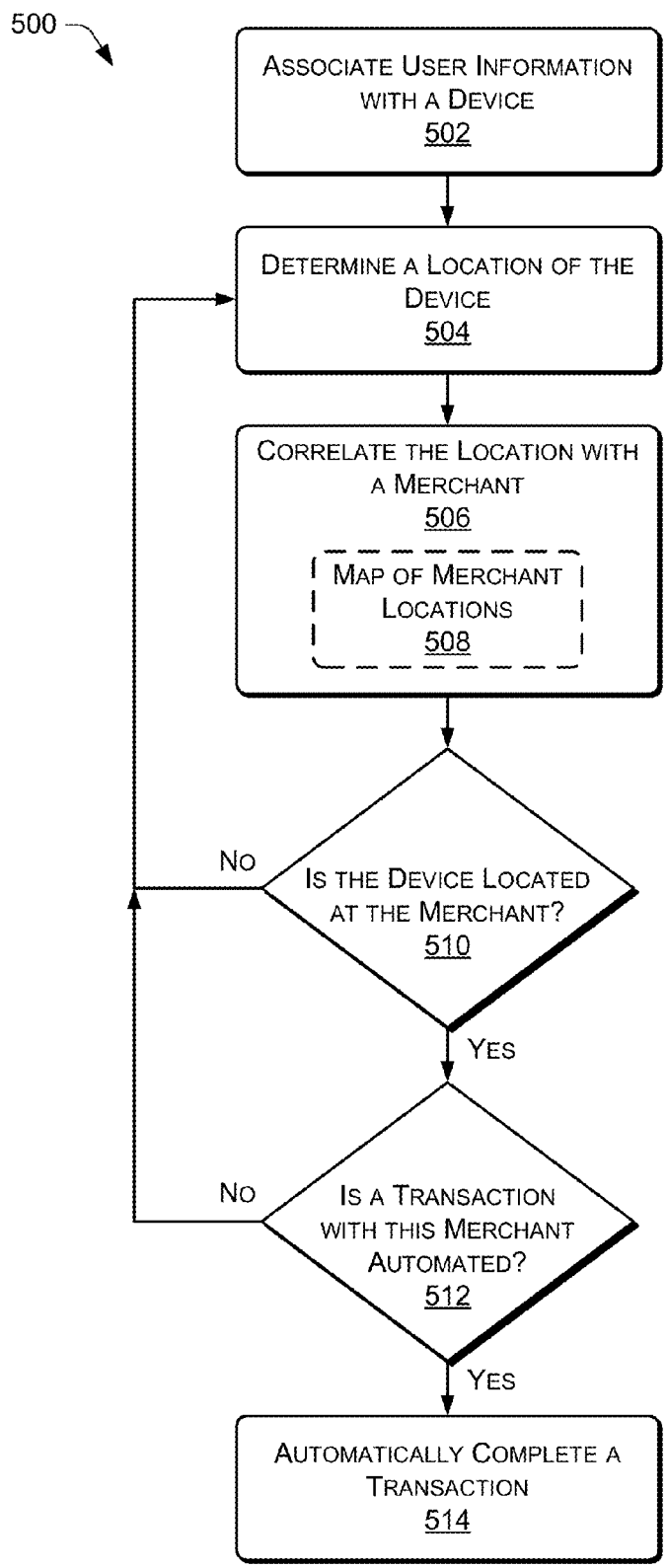
FIG. 5 is a flow diagram of an illustrative process for automatically completing a transaction between a user of a mobile device and a merchant.

FIG. 5 illustrates a process 500 that includes associating, at operation 502, user information with a device. The user information may comprise, for instance, the user information 122 illustrated in FIG. 1. In some implementations, the device may be the mobile device 104 illustrative in FIG. 1. Associating user information with the device ties the identity of the user to the device and allows the device to represent the user in some electronic transactions. Next, at operation 504, the location of the device is determined. As described above, the location may be determined by a location sensor 230 that determines a geolocation as illustrated in FIGS. 1 and 2.

Operation 506 then correlates the location with a merchant. The merchant may, for example, provide a wireless network connection inside or proximate to its premises and the connection may identity the merchant. By doing so, each device using that network connection may recognize its current location as being at the merchant. In some implementations, the device may additionally or alternatively be aware of an abstract location such as a latitude and longitude provided by GPS. A map of merchant locations 508 may be used to match the latitude and longitude of the device with a merchant location. There may be locations at which the geolocation of the device can be identified; however, that geolocation might not correlate with any merchant location. For example, the device may be on a street near to several merchants but not located at any of those merchants.

At decision point 510 it is determined if the device is located at the merchant. In some instances, this determination may include determining if the device is within the merchant, while in other instances this may include determining if the device is within a predetermined distance of the merchant. If not, process 500 follows the "no" path and returns to operation 504. This loop may repeat continually until the device is located at a merchant. When the device is located at a merchant, process 500 follows the "yes" path to decision point 512.

At decision point 512, it is determined if transactions with this merchant are automated. For example, the user may decide that he or she wants to complete certain types of transactions with certain types of merchants in an automated manner. In such situations, the user may activate an automatic transaction functionality of his or her mobile device. However, for other merchants, or for other types of transactions, the user may desire more interaction such as specifying the details of the transaction or affirmatively agreeing to the transaction. If this transaction with this merchant is not automated, process 500 follows the "no" path and returns to operation 504. If the transaction is automated then process 500 follows the "yes" path to operation 514.

At operation 514 a transaction between the user of the device and the merchant is completed automatically in some instances. This automatic completion of the transaction when the user is located at the merchant creates a friction-free experience for the user. The coupling of location awareness with a mobile computing device allows for zero-click transactions.

As one illustrative example, a user could associate her prepaid card (or other payment instrument) for the local coffee shop with a mobile device. The user could additionally set her favorite drink at this coffee shop as a tall latte. This information may be stored on the mobile device, such as user information 210, or somewhere on a network, such as user information 122. The local coffee shop may have many stores and each store location may be associated with unique latitude and longitude coordinates. When the user carrying her mobile device arrives at any of the store locations the device recognizes those coordinates as corresponding with the local coffee shop and implements a transaction specified by the user. In this example, the user can specify that the mobile device uses her prepaid card to purchase a tall latte whenever she enters one of the local coffee shop locations. The user can walk directly to the counter and pick up her tall latte without opening her wallet or even verbally placing an order. This is a friction-free transaction. This example may take several variations. For instance, the merchant may ask the user to show an identification of the user (e.g., a driver's license), to orally state a password associated with the user, or the like. Or, the user may receive a phone call or a text message and may confirm completion of the transaction via one of these communication channels.

As another illustrative example, the merchant may be an ambulance that is itself mobile with location awareness and ability to communicate with mobile devices. A portion of the user information 122 and/or 210 may contain medical information about the user. This information may be encoded, available only through predetermined APIs, or otherwise limited so that is only released to "merchants" that provide medical services such as the ambulance. When the geolocation of the ambulance and the geolocation of a mobile device are the same, the medical information from that mobile device may be automatically provided to medical service providers in the ambulance. That medical information could potentially contain a photo of the user so that the paramedics can confirm that the person actually in the ambulance is the correct user to associate with the medical information. This medical information may include, for instance, a medical history of the user, medications that the user is allergic to, and the like, thus allowing the paramedics to properly treat the user in the event of an emergency.

The mobile device 104 may also facilitate transactions with merchants even when the user 102 is not at or near the geolocation of the merchant 106. For example, some merchants such as an online dating/matchmaking service may not have a physical location of relevance to users. For this type of merchant, the point-of-sale device 110 may be a server itself or a component of the merchant server 108. In such cases, the user 102 may be at a geolocation associated with another merchant such as a restaurant, but interact with the online merchant.

In an online dating implementation, transactions may be dependent upon the geolocation of one user relative to another user rather than the geolocation of the user 102 with respect to the merchant 106. For example, members of the online dating service may choose to make the geolocations of their respective mobile devices available to a merchant server of the online dating service. The merchant server may determine if two mobile devices are within a threshold distance of each other and if the two users are determined to be a match by the dating service (e.g., a match may be defined at least in part upon user information 122 such as the user profile 404), a transaction may be initiated between one or both of the mobile devices and the online dating service. The transaction may comprise a notification of a "member match" to which one of the users may respond by requesting to contact the other user who is the "member match." The other user receiving the contact request may accept the contact request, decline the contact request, or ignore the contact request. If the contact request is accepted, the online dating service may allow mediated contact between the two users. In some implementations, direct contact information may be kept private so that communication between the two users must go through the online dating service (e.g., the merchant server of the online dating service).

Figure 6:
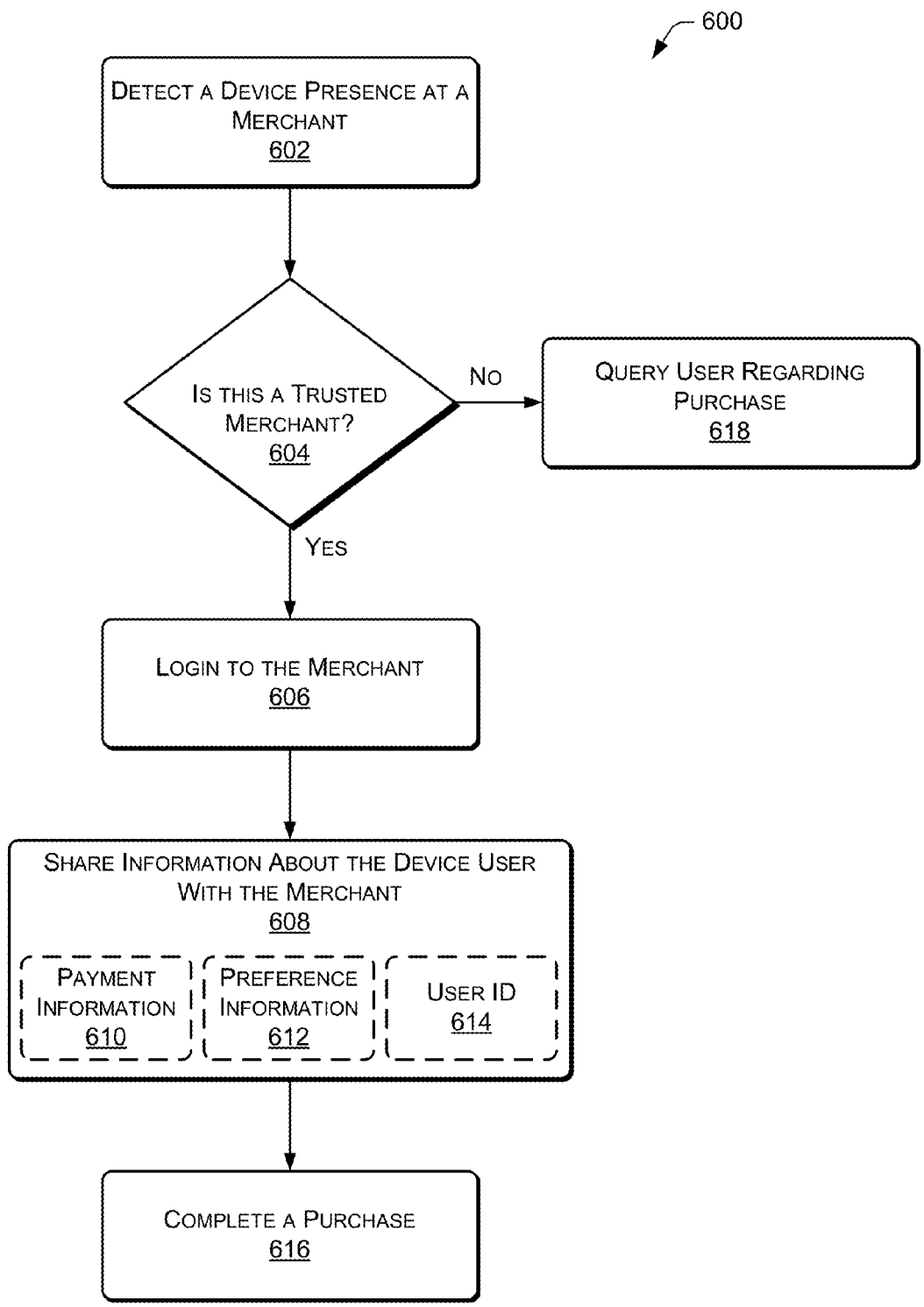
FIG. 6 is a flow diagram of an illustrative process for completing a purchase by sharing information about the mobile device user with a merchant.

FIG. 6 illustrates process 600 that includes detecting a presence of a device at a merchant 602. The detection may be performed by the mobile device, the merchant, a network component, such as server(s) 118 illustrated in FIG. 1, or a combination thereof For example, a distance of the mobile device from three cell phone towers may be used to triangulate a geolocation of the mobile device and that geolocation may be used to detect that the mobile device is present at the merchant. The designation of the device as present at the merchant may be context dependent (e.g. it may depend on a neighborhood density). For example, in a dense neighborhood with lots of shops directly adjacent to one another "presence" may be defined by a narrow spatial boundary and a requirement that the mobile device remain within that boundary for a period of time such as 30 seconds, 10 minutes, one hour, etc. The time requirement may prevent accidentally detecting the mobile device being "present" when in fact the user is merely passing by the merchant. In other contexts, for example a tollbooth on an empty highway, the mobile device may be designated as "present" at the tollbooth while still hundreds of yards away based on the speed and trajectory of the user device. This may allow the mobile device to pay the toll in time for the tollgate open without a vehicle approaching the tollbooth needing to substantially decrease speed.

At decision point 604, it is determined if the merchant is a trusted merchant for the user. The determination may be based in part on the list of trusted merchants 408 illustrated in FIG. 4. When the merchant is a trusted merchant, process 600 proceeds along the "yes" path to operation 606. At operation 606, the user device logs in to the merchant. The login may be completed using the user identifier 208 illustrated in FIGS. 2, 3, and 4.

At operation 608, information about the device user is shared with the merchant. The information may include payment information 610, preference information 612, and a user identifier 614. In some implementations the user identifier 614 provided to the merchant in this operation may be the same user identifier 208 discussed above. In other implementations, the user identifier 614 in operation 608 may be different such as a unique user identifier 614 for this particular merchant, a "nickname" that is a proxy for the user identifier 614, or other identifier. Information may be shared with a point-of-sale device 110 of the merchant such as illustrated in FIG. 1. The preference information 612 may indicate what type of good or service the device user prefers to purchase.

Returning to the coffee shop example, the preference information 612 may indicate that the user wishes to purchase a tall latte when at that coffee shop. In the tollbooth example, the preference information 612 may indicate that a user operates a motorcycle rather than a car, and thus, wishes to pay the appropriate toll for a motorcycle. In some implementations, the mobile device may simply provide the user identifier 614 to the merchant and merchant may retrieve other information linked to the user identifier 614 (e.g., payment information, preference information, etc.) from a communication network such as the network 116 illustrated in FIG. 1.

Next, at operation 616 the purchase between the user and the merchant is completed. The purchase may be completed using the payment information 606. It may also be completed using preference information 612, which in some implementations, may be used to automate the purchase so that the good or service indicated by the user preference information 612 is automatically purchased when the mobile device is detected at a merchant. In other implementations, completing the purchase at operation 616 may involve only a single interaction between the user and the mobile device. For example, the user may need to press a particular number on a numeric key pad or a soft key on a touch screen display of the mobile device. Additionally, the single interaction may comprise speaking into a microphone on the mobile device or shaking the mobile device to activate an accelerometer inside the mobile device. Some transactions, meanwhile, may involve multiple interactions.

If however, at decision point 604 the merchant is not recognized as a trusted merchant, process 600 proceeds along the "no" path to operation 618. At operation 618 the user is queried regarding if and how to proceed with a purchase at this merchant. For example, the user may decline to interact with this non-trusted merchant. Alternatively, the user may elect to login to the merchant even though it is not a trusted merchant and proceed to complete a purchase.

Figure 7:
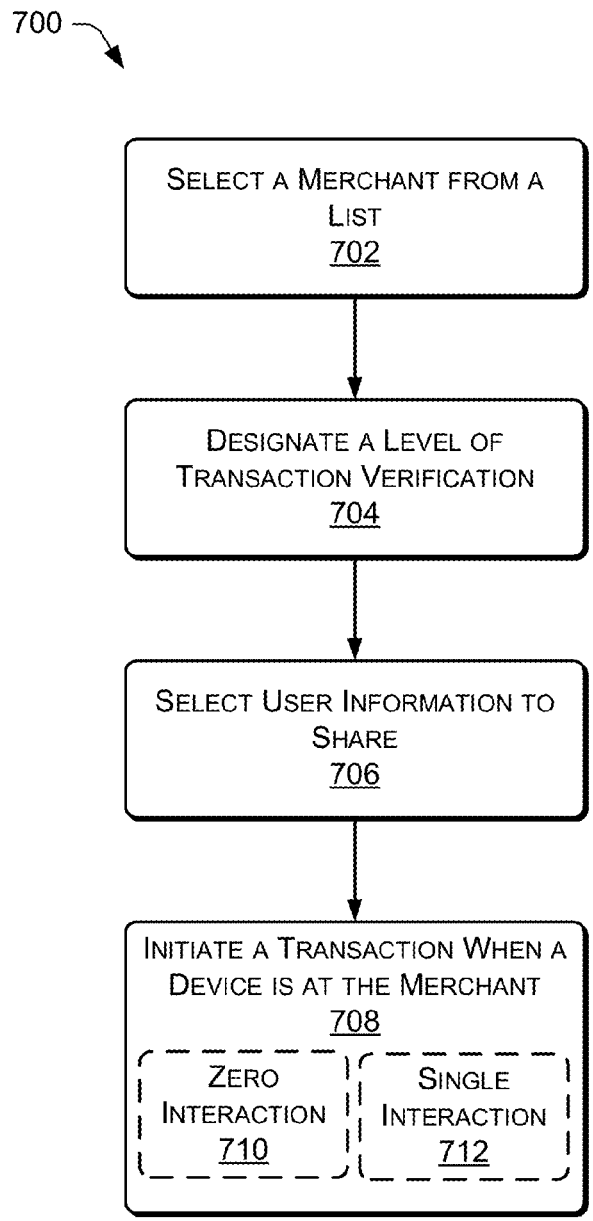
FIG. 7 is a flow diagram of an illustrative process for setting up a mobile device to conduct low-friction (e.g., zero-interaction or single-interaction) transactions with a merchant.

FIG. 7 illustrates process 700 for setting up a mobile device to interact with a merchant in the one or more of the manners described above. The user may select a merchant from a list of merchants at operation 702. The list of merchants may include merchants that choose to participate in this system of electronic commerce. This selection may be performed on the mobile device or on another computing device from which the list of selected merchants is then sent to the mobile computing device. At operation 704, a level of transaction verification is designated for one or more of the selected merchants. The level of transaction verification does not necessarily correspond to the trust levels discussed above. The user may designate certain merchants with whom he or she may complete transactions with a transaction verification (and, hence, with whom the user wishes to complete transactions automatically with zero interaction with his or her mobile device). Examples for which this level transaction verification may be suitable are coffee shops and tollbooths, among others. For other merchants the user may wish to take some affirmative step to verify the transaction and will therefore designate that a single interaction (or more) with the mobile device is to be used to verify the transaction. This may be desirable for trusted merchants that sell relatively expensive goods or services. For example, the user may wish to use his or her mobile device to pay for veterinary services, but does not want a $1,000 charge placed on to his or her account without at least a single interaction on the mobile device verifying that transaction. For other merchants, it may be possible to designate a level of transaction verification that requires more than a single interaction. This higher level of verification may be anything from pressing two keys on the mobile device to a complex login process that includes entering a password and providing payment information such as a card number.

At operation 706, user information to share with a merchant is selected. The user information may include any or all of the user information 122 shown in FIG. 1 and/or the user information 210 shown in FIG. 2. For example, sharing the user identifier 208 with the merchant will enable the merchant to recognize that mobile device by the user identifier 208. Additionally, the user may choose to share different information with different merchants. For example, credit card information may be shared with one merchant while bank account information is shared with a different merchant.

Next, at operation 708 a transaction is initiated between the merchant and the mobile device when the mobile device is at the merchant. The transaction may be verified according to the level of transaction verification indicated at operation 704. As discussed above, in some implementations, this may comprise zero interaction 710 and in other implementations this may comprise a single interaction 712 (or more) between the user and the mobile device. Setting up the mobile device in advance can establish default behavior when the mobile device is present at a merchant location. In some implementations, this setup information may expire after some length of time such as 24 hours. Upon expiration, the level of transaction verification may be reset to require a complete login for every merchant or in some implementations the number of interactions required may be raised incrementally (e.g., zero interaction merchants now require a single interaction, single interaction merchants now require at least two interactions with the mobile device, etc.). In other implementations, the setup information may not expire but rather persists until the user makes a change.

Figure 8:
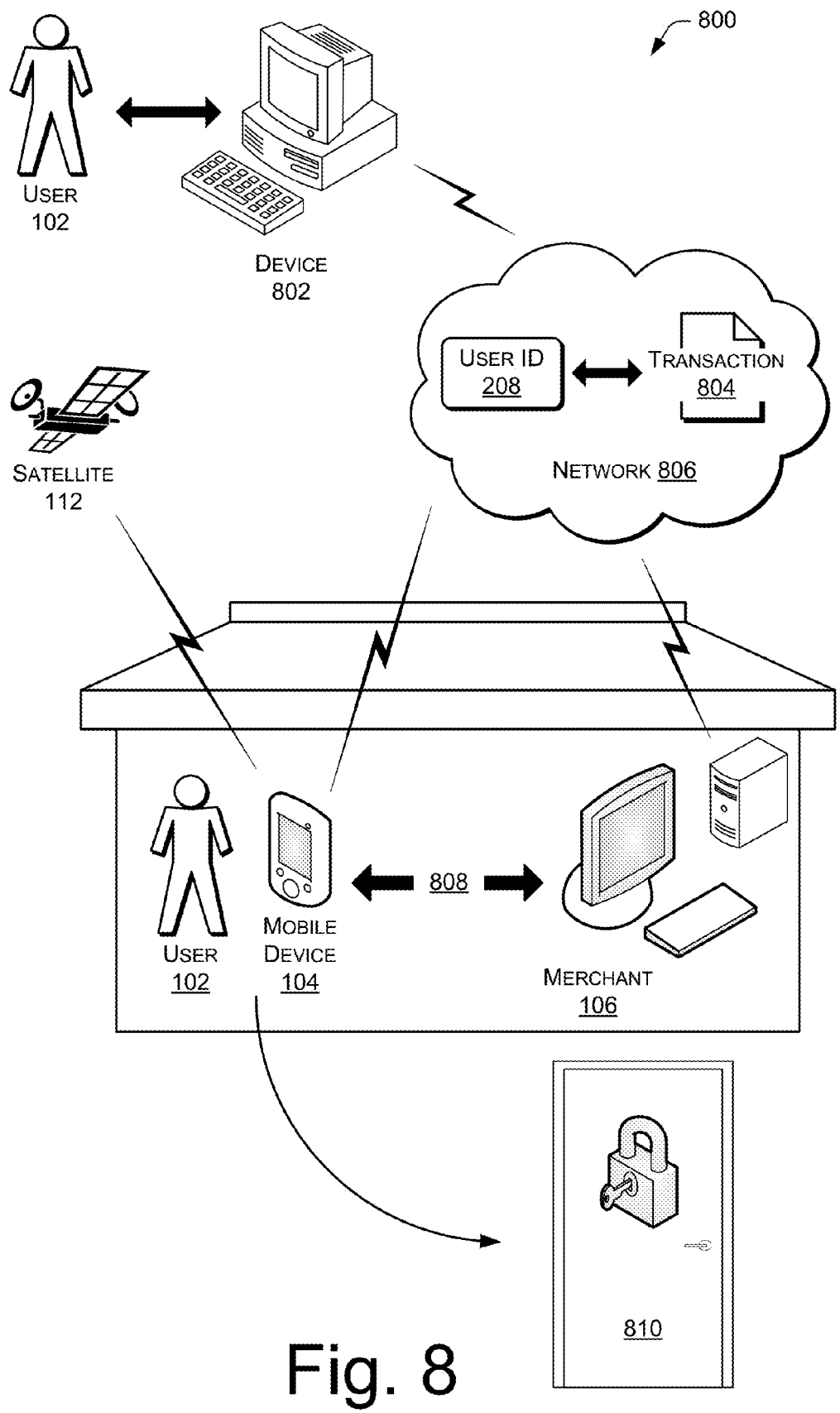
FIG. 8 shows an illustrative architecture for a user of a mobile device to complete a transaction with a merchant upon arrival at the geolocation of the merchant.

FIG. 8 shows an illustrative architecture 800 in which a representative user 102 employs a device 802 to initiate a transaction that will be completed when the user later arrives at the merchant 106. The processes shown previously in FIGS. 5-7 are generally related to transactions that are initiated when the user 102 is at the same location as the merchant 106. The architecture 800, however, is additionally applicable in situations where the user 102 may initiate a transaction at one place and point in time and then later complete the transaction upon arrival at the merchant 106.

The user may initiate a transaction 804 through interaction with device 802. Device 802 may be the mobile device 104 or it may be a different computing or communication device such as a telephone, a desktop computer, laptop computer, thin client, set top box, game console, or the like. Device 802 may be connected directly or indirectly to a network 806. The network 806 may be the same network as network 116 illustrated in FIG. 1. A user identifier 208 is associated with the transaction 804. The user identifier 208 enables the merchant 106 to match transaction 804 with the correct user. Initiating that transaction may place that transaction in a transaction queue of the merchant 106. In some implementations this transaction queue may be maintained on the merchant server 108 illustrated in FIG. 1. The transaction queue could contain such things as a pre-order for a cup of coffee (to be delivered when the user arrives at the coffee shop) or a hotel reservation (to be confirmed with the user checks in to the hotel). Transactions may remain in the transaction queue for some period of time (e.g., minutes or days), but instantaneous, or nearly instantaneous, implementations are also possible.

The user 102 later arrives at the merchant 106 with his or her mobile device 104. Recall that the mobile device 104 may also be associated with the user identifier 208 as illustrated in FIG. 2. In some implementations, a satellite 112 provides the mobile device 104 with a geolocation that can be compared with or matched to a geolocation of the merchant 106. When at the merchant's location the mobile device 104 and a computer system of the merchant 106 can communicate directly over a communication path 808 or indirectly via the network 806. The merchant 106 may access the network 806 to retrieve the transaction 804 when the mobile device 104 associated with user identifier 208 is present at the merchant location. Information provided by the merchant 106 to the mobile device 104 may be used by the user 102 to complete the transaction 804. In some implementations, completing the transaction may involve the user being charged and subsequently gaining access to a secure location 810. The secure location 810 may comprise a hotel room, an airplane, a person's home, a workplace, inside the borders of a country, or any other geolocation to which entry is regulated. Entry to the secure location 810 may be provided by a code personalized to the user 102. The personalized code may be stored in the user information 122. For example, the code may be a series of numbers and letters that the user 102 wishes to re-use whenever access requires entry of a code on a key pad or such. As a further example, the code may be based at least in part on biometric data from the user 102. Biometric data is discussed below in more detail in relation to FIG. 14. In some implementations, this code may be hidden from the merchant 106 so that the merchant 106 only receives the user identifier 208, but cannot access the user's personalized code.

For example, a user may make a hotel reservation from his home computer. The reservation along with his user identifier is transmitted across a communication network to the computer systems of the hotel. Some time (e.g., days) later when the user arrives at the hotel and his mobile device is detect at the geolocation of the hotel, the user identifier contained in his mobile device is used to retrieve the reservation. After confirming payment, such as by a credit card also linked to his user identifier, the hotel sends a text message or other communication to his mobile device that contains his room number. This may happen while he is walking through the lobby to the elevators without ever stopping at the front desk. Once at his room, the presence of his mobile device outside the door may be detected by a wireless communication network in the hotel and the door may be automatically unlocked. Room keys may be provided inside the hotel room. In implementations in which the user identifier is also linked to a user profile (and the user has elected to share his user profile with the hotel), the user profile may be used to customize his guest experience at the hotel by, for example, instructing the hotel staff to place his favor type chocolate on the pillow. Similar to the purchase of goods, the system can provide a friction-free experience for the purchase of services.

As a further example, the architecture and systems described herein can be applied to immigration and border security. In this context, the transaction 804 may be the granting of entry to a country. Initially, the person wishing to travel to a different country may enter user information about the potential trip into a computing device 802 and associate that information with the transaction 804 as well as a user identifier 208 for the potential traveler. In some implementations, a passport number could be used as the user identifier 208. Upon arrival at immigration in the destination country, mobile device 104 carried by the traveler may signal to the immigration authority that this person has arrived and is requesting entry. In some implementations, the user identifier 208 may be associated with a mobile device 104, such as a mobile phone, that the user 102 is instructed to bring when they travel to the other country. In other implementations, the mobile device 104 may be a miniaturized electronic device that is attached to the user's passport as an entry visa. In yet other implementations, the passport itself may comprise the mobile device 104 and an RFID in the passport may be the user identifier 208. This system may reduce the friction associated with processing people entering a country by allowing the immigration transaction to be partially completed in advance and by automatically identifying the people and the corresponding information when they are located at an entry point.

Figure 9:
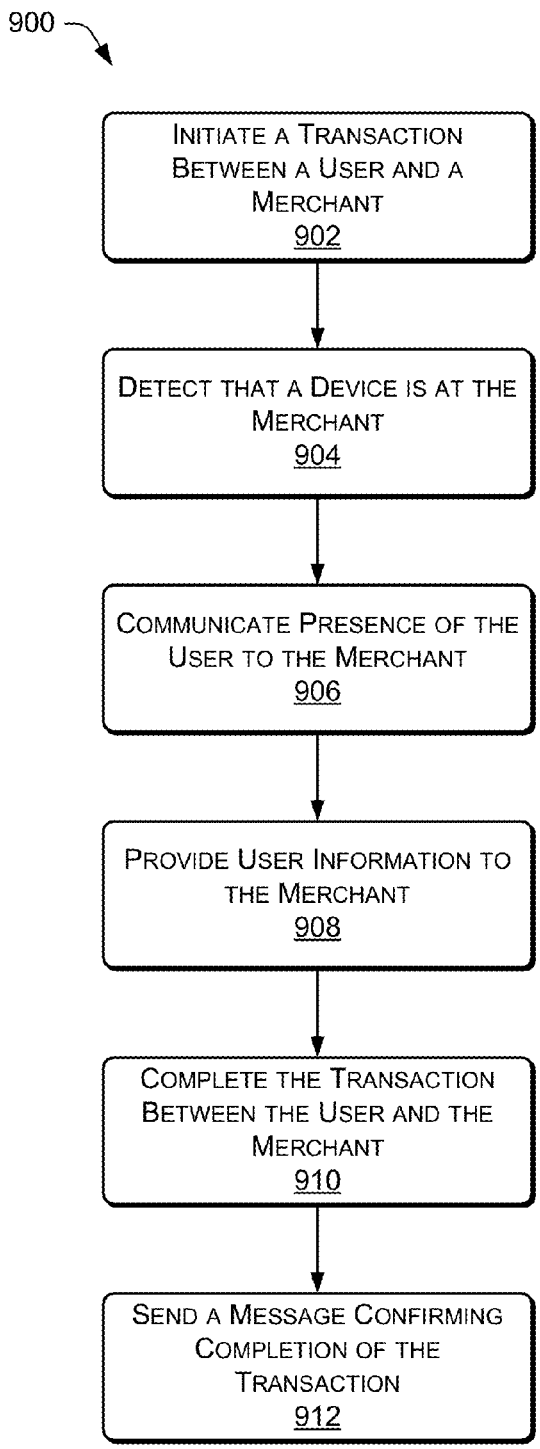
FIG. 9 is a flow diagram of an illustrative process for completing a transaction with a merchant when a mobile device and the user of the mobile device arrives at the merchant.

FIG. 9 illustrates a process 900 for completing a transaction between a user and a merchant when the user arrives at a geolocation of the merchant. At operation 902, a transaction is initiated between the user and the merchant. Initiation of the transaction may be separated in space and in time from completion of the transaction; however, such separation is not necessary.

Upon arrival at the merchant's geolocation, the mobile device is detected at the merchant in operation 904. The detection may be direct such as implementations in which a signal broadcast by the mobile device is picked up by a receiver at the merchant. Alternatively, the detection by be indirect or inferred by correlating a current geolocation of the mobile device with a geolocation of the merchant. At operation 906, the presence of the user is communicated to the merchant. The communication may trigger the merchant to access the transaction.

User information may be provided to the merchant at operation 908. The user information may be provided directly from the memory of the mobile device or a user identifier associated with the mobile device may be used to retrieve user information from a network or other remote data source. As discussed earlier, the user information may include payment information, a user profile, and the like. The user profile may include user preferences that the merchant uses to modify the transaction. User preferences may include such things as window or aisle seat on an airplane, smoking or non-smoking rooms in a hotel, and the like. Next, at operation 910, the transaction between the user and the merchant is completed. Completion may include collecting a payment, confirming a reservation, making a purchase, etc.

Following completion of the transaction, at operation 912, the merchant may send a message to the mobile device confirming completion of the transaction. The message may be a receipt for the transaction, or in some implementations, it may be a code or other information that is necessary to access a secure location such as a hotel room or an airplane. For example, the message may comprise a boarding pass barcode that can be displayed on a screen of the mobile device and scanned by conventional equipment when the user boards an airplane. In other implementations, the message may be an electronic token that provides additional functionality to the mobile device. For example, the electronic token may allow the mobile device to broadcast a signal (e.g., analogous to a garage-door opener) that may be used to open a door and gain access to the secure location.

Illustrative Parent and Child Devices

Figure 10:
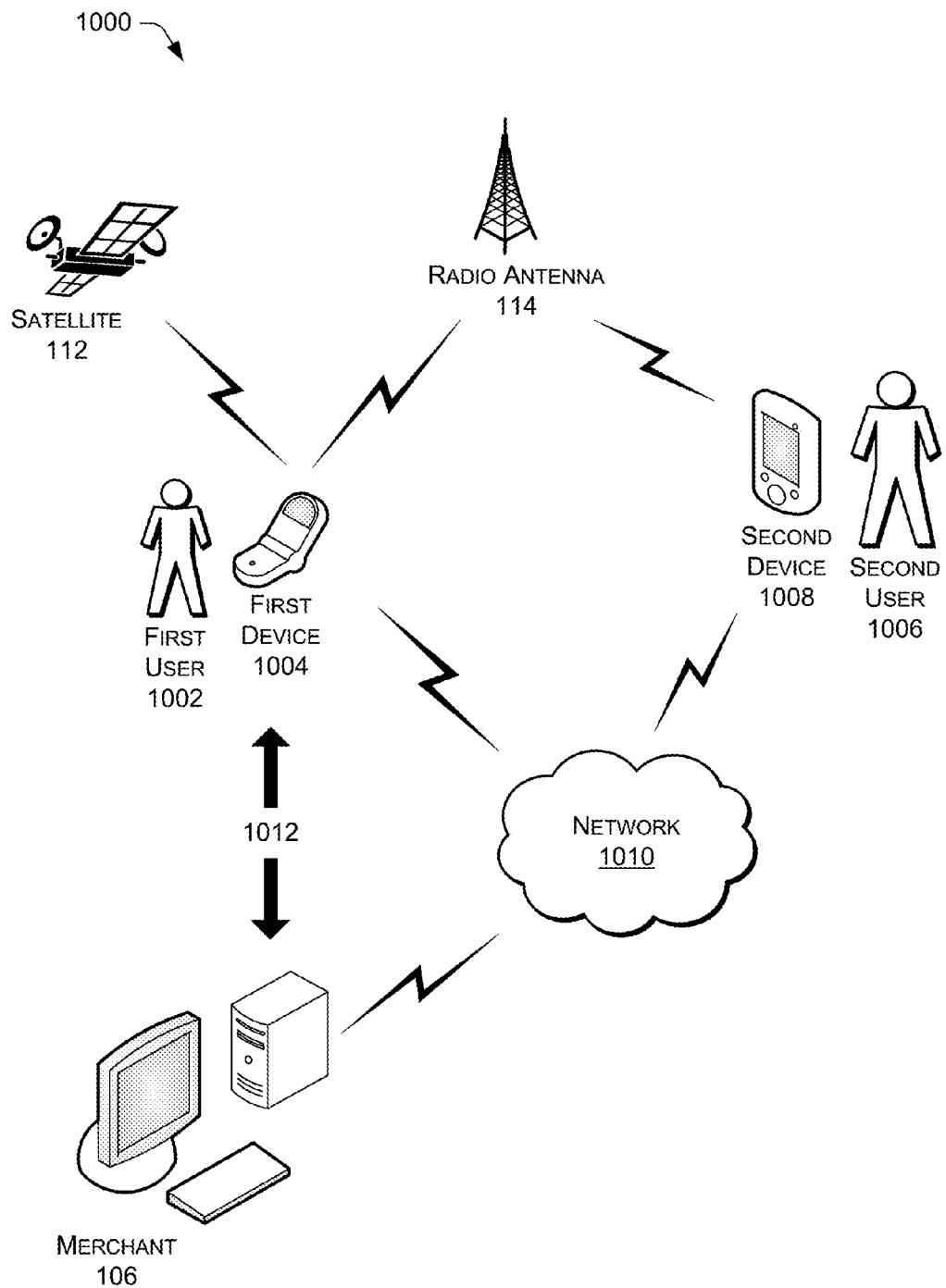
FIG. 10 shows an illustrative architecture for conducting transactions between a child device and a merchant mediated by a parent device.

FIG. 10 shows an illustrative architecture 1000 in which a two devices having a parent-child relationship interact to complete a transaction with a merchant. While this example describes the techniques in the parent/child context, these techniques may similarly apply for employer/employee contexts, teacher/student contexts, adult child/senior parent, and/or any other context. This relationship may be generally thought of as a master-slave relationship between computing devices. The child 1002 is a user of a child device 1004. The child device 1004 may be associated with a given user (i.e., the child 1002) based on a login or authentication of the user on the child device 1004. In some implementations, the login may be tied to the user information 122 of the child 1004 thus providing the same features, and parentally imposed limitations, on any device that the child 1002 uses. The child device 1004 may be a mobile device similar to the device 104 illustrated in FIG. 1. In some implementations, the child device 1004 may be designed with a simple user interface, limited features, large buttons, bright colors, and/or otherwise adapted for a younger user. A parent 1006 interacts with a parent device 1008. The parent 1006 and the parent device 1008 may be similar to the user 102 and the mobile device 104 illustrated in FIG. 1. However, the parent device 1008 may be a non-mobile device, such as a desktop computer. Although designated herein as a "parent" and a "child" the two users may have a relationship other than a parent-child relationship, as discussed above. However, as will be described in more detail below the parent device 1008 may have limited control and/or supervision functionality with respect to the child device 1004. This hierarchical relationship between the two devices could be implemented in an employment context as well as a family context.

The satellite 112 and the radio antenna 114 are the same as shown in FIG. 1. The child device 1004 is aware of its geolocation, or another entity is able to track this geolocation. The geolocation information may be provided by the satellite 112, the radio antenna 114, and/or alternative sources as discussed above. The child device 1004 and the parent device 1008 share at least one communicative connection. In some implementations, such as mobile phones, the two devices may communicate via the radio antenna 114. In the same or different implementations, the two devices may have a connection to a network 1010 such as the Internet. The network 1010 may be the same as the network 116 shown in FIG. 1. In other implementations, it may be a different network such as a subset of the network 116 restricted to only content and connections that are deemed suitable for a child.

The merchant 106 may also have a connection to the network 1010 over which information may be shared with either the child device 1004 or the parent device 1008. The child device 1004 may communicate with the merchant 106 across the network 1010 and/or communicate directly with the merchant 106 over a direct communication link 1012. The direct communication link 1012 may be similar to the direct communications link 120 illustrated in FIG. 1.

Figure 11:
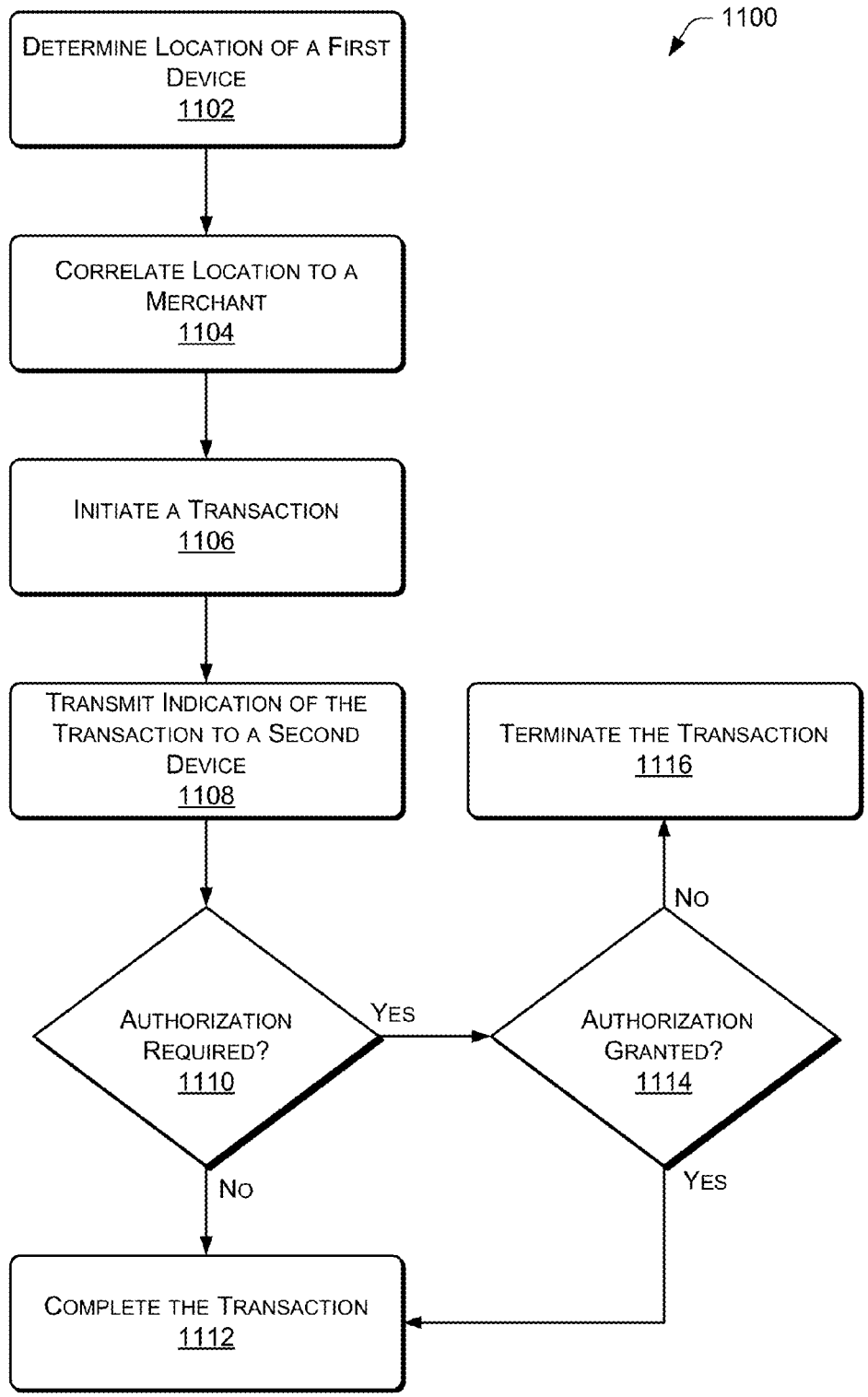
FIG. 11 is a flow diagram of an illustrative process for completing a transaction between a child device and a merchant and transmitting an indication of the transaction to a parent device.

FIG. 11 illustrates process 1100 for completing a transaction between a child device and a merchant and transmitting an indication of the transaction to the parent device. At operation 1102, a geolocation of the child device is determined. The geolocation of the child device may be determined in reference to the satellite 112 or radio antenna 114 shown in FIG. 10. Next, at operation 1104 the geolocation of the child device is correlated to a merchant. Correlation may be accomplished through any of the mechanisms discussed above such as, for example, comparing the geolocation of the child device to a map of merchant locations. At operation 1106, a transaction is initiated between the user of the child device and the merchant. The transaction may be initiated automatically in some implementations, or in other implementations the transaction may involve one or more inputs from the user of the child device before initiation.

An indication of the transaction is transmitted to a parent device at operation 1108. The indication may inform the user of the parent device about the details of the transaction between the child device and the merchant. In some implementations, the indication may be provided in real-time to the parent device. A record or log of transactions of the child device may be maintained for access by the user of the parent device. The log may store any combination of transactions initiated, completed, and/or denied. In some implementations the log may be similar to the transaction record 406 illustrated in FIG. 4. The log may be stored in association with the user identifier of either the parent or the child. Depending on the level of control for parent wishes to exercise over transactions made by child, parental authorization from the parent device to the child device may be necessary to complete the transaction. A requirement for parental authorization may depend on the nature of a transaction. For example, a parent may configure the system to allow the child to purchase books without parental authorization, but to require parental authorization for purchases of candy. Additionally, or alternatively, the requirement for parental authorization may depend of a value of the transaction (i.e., dollar value), a geolocation of the child device, and/or other factors. In one implementation, the parent may provide the child with a budget (in terms of money or other metric) and when the child is under budget authorization may not be required, but authorization may be required for transactions that exceed the budget. In situations for which parental authorization is required, the indication may include a request that the parent respond by either authorizing or denying the transaction.

At decision point 1110, is determined whether or not parental authorization is required. When parental authorization is not required, process 1100 proceeds along the "no" path to operation 1112. At operation 1112, the transaction between the child device and the merchant is completed. In some implementations, the transaction may be completed based in part upon a user profile associated with the child. Furthermore, in the same or different implementations, a user profile associated with the parent may also affect how the transaction is completed. For example, if the child has indicated that he or she wishes to automatically a purchase particular candy upon entering a candy store, that portion of the child's user profile may be used to complete a purchase of that type of candy. The user profile associated with the parent may be used for, among other things, a source of payment information to complete the candy purchase.

When parental authorization is required, the process 1100 proceeds from decision point 1110 along the "yes" path to decision point 1114. At decision point 1114, it is determined whether or not the parental authorization has been granted. When parental authorization is granted, for example by the parent interacting with the parent device, process 1100 proceeds along the "yes" path to operation 1112 and the transaction is completed. However, when authorization is denied the process 1100 proceeds along the "no" path to operation 1116 and the transaction is terminated. Termination of the transaction may result in a message being sent to the child device and/or the merchant.

Security for Mobile Devices

Figure 12:
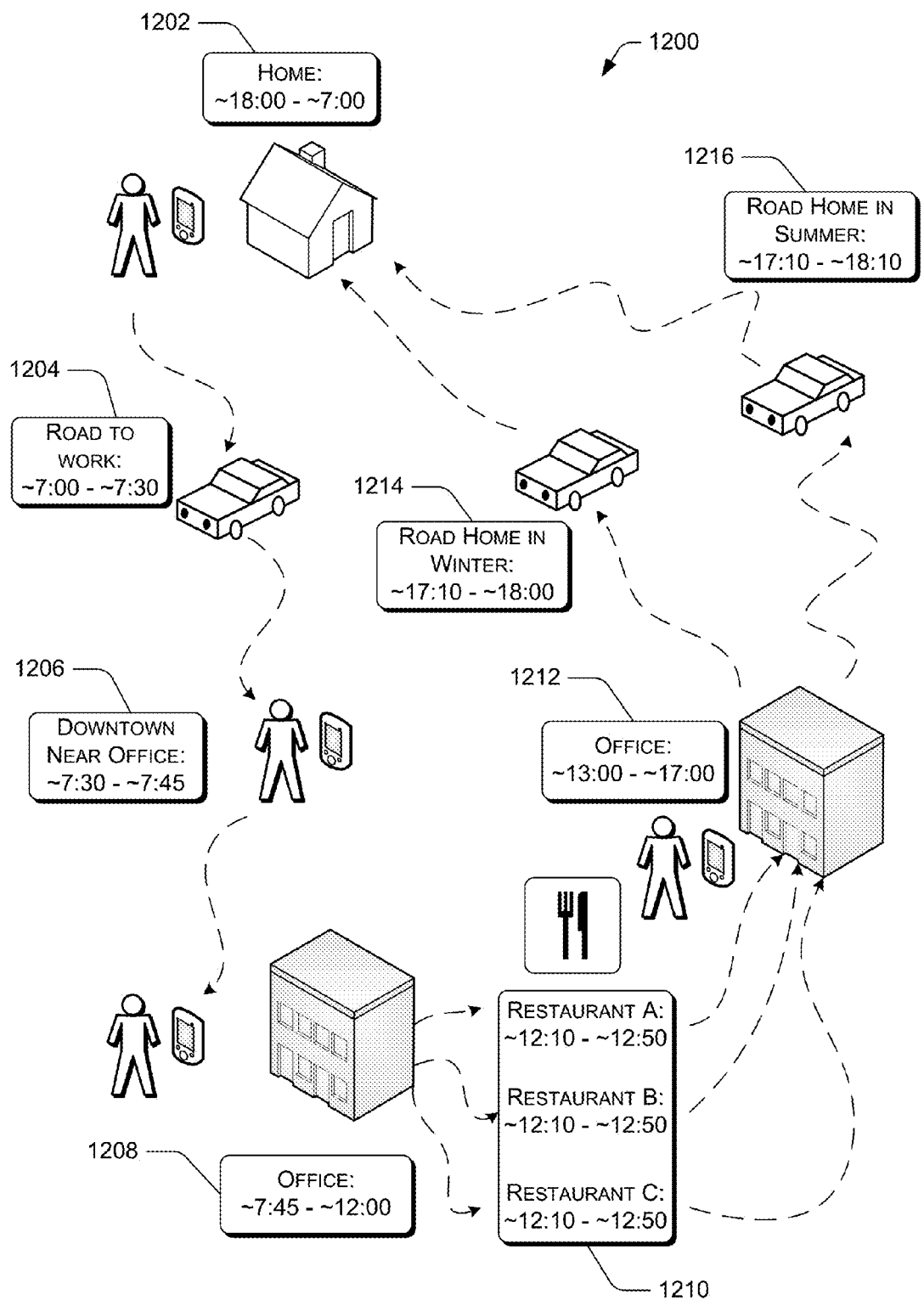
FIG. 12 shows an illustrative map of temporal-geo-locations of a mobile device during a workday of a user of the mobile device.

FIG. 12 shows an illustrative map 1200 of temporal-geo-locations of a mobile device during a workday of a user of the mobile device. By creating a map of where the device is typically located and when the device is at those locations, variance from those patterns can serve as a trigger to suggest that the device may have been stolen or misplaced and initiate a security event such as shutting down the device or requiring a password to complete purchases with the device. This type of security feature may be implemented automatically by the device itself before the user is even aware that a problem exists. The mobile device may include a security module 214 as illustrated in FIG. 2 for implementing these security features.

The user may begin his workday at his home which has a fixed geolocation. Typically he—specifically his mobile device—may be at home from approximately 6:00 PM until approximately 7:00 AM and this comprises a first temporal-geo-location 1202 for his workday. Commuting from home to work may involve driving along the road to work between approximately 7:00 AM to approximately 7:30 AM. His automobile may include an additional device, such as an on-board navigation system, that is also associated with his user identifier 208, and thus, also contributes to building a map of temporal-geo-locations for the user. He may use the same route every day in commuting to work so the systems of the user device may recognize this temporal-geo-location 1204 even though it is not a single fixed position but rather a series of geolocations and a series of time points. After arriving downtown, the user's day may include another temporal-geo-location 1208 that comprises his walk from a parking area to his office between approximately 7:30 AM and approximately 7:45 AM. While at the office the user and the user device may move around within the office but remain at the geolocation of the office from about 7:45 AM to about 12:00 PM. This is another temporal-geo-location 1210.

Up until lunchtime this user's typical weekday schedule may be fairly consistent. However, during lunch he may move to a variety of geolocations associated with various restaurants shown here as Restaurant A, Restaurant B, and Restaurant C. The user may generally be inside one of the restaurants from approximately 12:10 PM to approximately 12:50 PM. This temporal-geo-location 1212 may have a well-defined time but a loosely defined location. For example, any geolocation within a 10 minute walk of the office may be deemed part of this user's typical weekday movements during the lunch hour. After lunch the user may return to the office. The office is at the same geolocation it was during the morning, but the time period is different so being in the office from about 1:00 PM until about 5:00 PM creates yet another temporal-geo-location 1214 in the map of this user's workday.

The user may have more than one route he takes home from work. During the winter, for example, the user may take a more direct road home leaving office at about 5:10 PM and arriving home at about 6:00 PM. This creates a temporal-geo-location 1214 across a range of space and time similar to the temporal-geo-location 1204 representing the road to work. In the summer, this user may take the scenic route home. The road home in summer may have a different geolocation in all or in part from the road home in winter. The road home in summer may also take longer so that while the user leaves the office at 5:10 PM he does not arrive home until 6:10 PM. This creates an alternate temporal-geo-location 1216 to the temporal-geo-location 1214 representing the road home in winter. Depending on the security settings of the mobile device, the mobile device may not trigger a security event no matter which route the user takes home even if he uses the winter road during the middle of summer Alternatively, if stricter security settings are applied then taking the summer road during midwinter may trigger security event, but during mid-March the mobile device may tolerate the user taking either road without triggering a security event.

By recording times, dates, and geolocations as the mobile device is used and moved it is possible for a security system, for example security module 214, to learn what are typical movements through space and time. This "geolocation signature" of the user can be stored in a data file as a series of time-location data points. Some or all of these data points may be layered together to create a multidimensional map containing past geolocation and time information for the mobile device.

Figure 13:
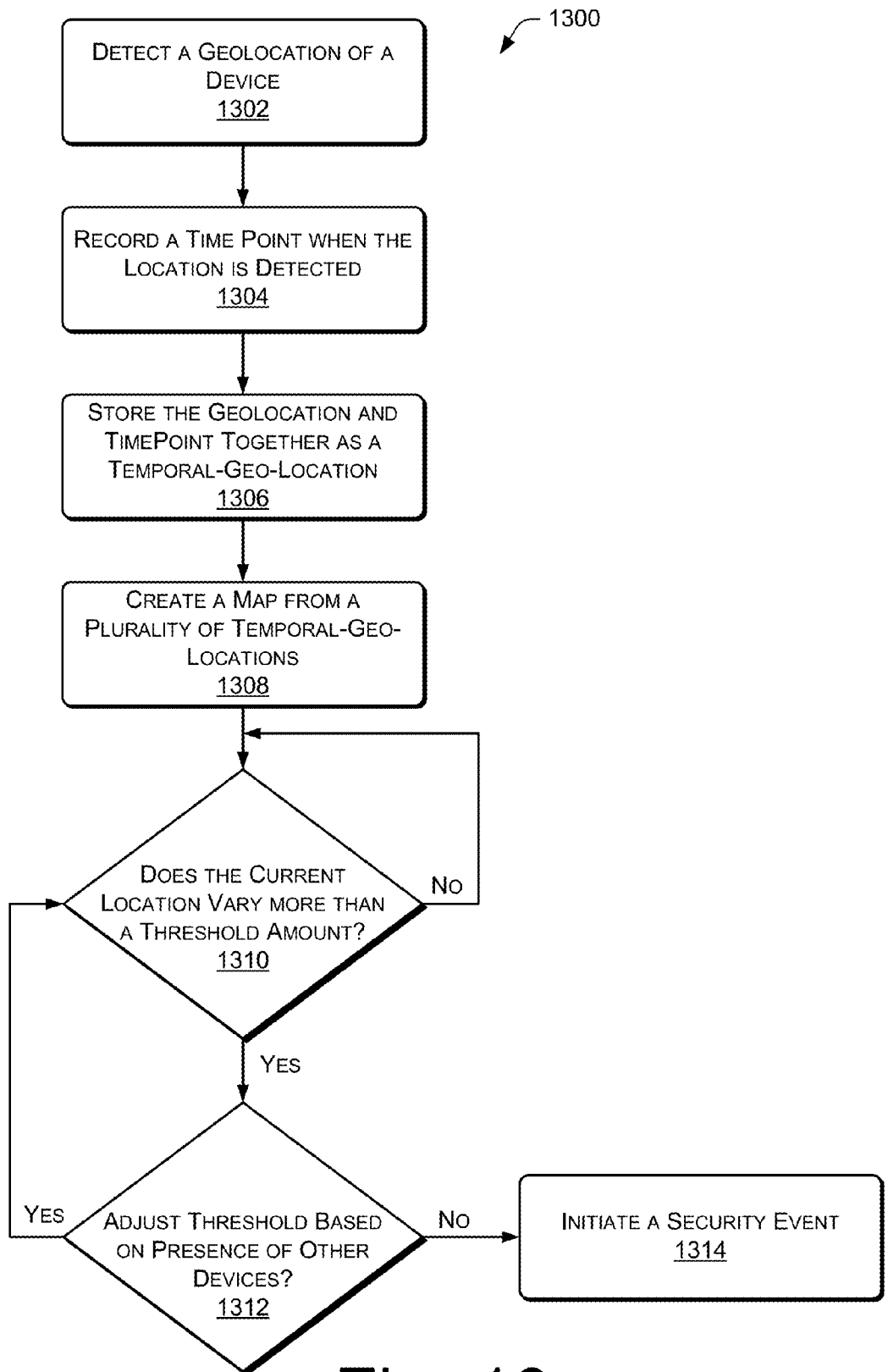
FIG. 13 is a flow diagram of an illustrative process for securing a mobile device based on variance from a map of temporal-geo-locations.

FIG. 13 illustrates process 1300 for securing a mobile device based on variance from a map of temporal-geo-locations. At operation 1302, a geolocation of the mobile device is detected. At operation 1304, a time point when the geolocation is detected is recorded. Next at operation 1306, the geolocation is stored in association with the time point at which the geolocation was detected. This combination of geolocation and a time point is a temporal-geo-location. Temporal-geo-location data points may be recorded with varying levels of granularity based on things such as a memory capacity of the mobile device 104, velocity at which the mobile device 104 is traveling, and the like. Granularity of recording temporal-geo-location data points may occur with a regular frequency such as every 30 seconds or every 10 minutes. In some implementations this data may be stored in the memory 204 of the mobile device 104 shown in FIG. 2. The temporal-geo-location data may be stored, among other places, as user information 210 or in the security module 214 also shown above in FIG. 2.

A map is created from movements of the mobile device over time based on a plurality of the temporal-geo-locations at operation 1308. As indicated above, this may be a multidimensional map comprising a latitude dimension, a longitude dimension, a time dimension, and a date dimension. Including additional and/or alternate dimensions in the map is also possible. This map may become more detailed, and potentially more useful, as a greater amount of data is accumulated. For example, when a user initially purchases a mobile device it may not be possible for the mobile device to detect whether or not it has moved away from the user's "regular" temporal-geo map. If the user knows that he or she will be moving in ways that are atypical (i.e., "going off the map"), the user may manually turn off the recording of temporal-geo-location data points. This may prevent inclusion of data into the map that would degrade rather than improve the accuracy of the map.

In order to detect whether or not the mobile device has been stolen, misplaced, or is otherwise in the wrong place at the wrong time, decision point 1310 may compare the current temporal-geo-location of the mobile device with the map and determine whether or not the current temporal-geo-location varies more than a threshold amount from the map. In some implementations, this comparison may be achieved at least in part through the use of artificial intelligence, heuristics, or fuzzy logic. In some implementations, the threshold may be configurable by the user of the mobile device. The analysis may also draw upon calendar or scheduling information of the user to see if the user has a scheduled trip that varies from his regular map. The calendar information may be included in the user information 210 and provided to the security module 214.

When an amount of variance is less than the threshold amount, process 1300 proceeds along the "no" path and returns to decision point 1310 to once again query whether or not the mobile device has varied too far from the map. This loop may be repeated continuously, periodically, or randomly. The frequency of repeating this loop may be based in part upon processor power of the mobile device 104, a velocity at which the mobile device 104 is moving, and/or other factors. For example, the frequency of performing the analysis at decision point 1310 may be lower when the mobile device 104 is moving at a walking pace and the frequency may be higher when the mobile device 104 is moving at a highway speed (.e.g., while in a car).

The threshold amount may also be based at least in part on the presence of other mobile devices in the same geolocation or near to the mobile device. For example, a user may vary from his or her established map during a vacation. However, during the vacation the user may travel with his or her family members who may have their own mobile devices. In one implementation, the mobile devices of the family members (or, as a further example, coworkers) may be associated with each other. One type of association is the parent-child relationship illustrated in FIG. 8 above. The presence of these other mobile devices may be used to adjust the threshold. The absence of other devices may also be used to adjust the threshold. If, for example, the mobile device is rarely found in a particular geolocation unless other mobile devices are nearby, then the absence of those devices may be a variance from the user's map. For example, the mobile device associated with a parent may occasionally be located at a soccer field on evenings during which a child is playing soccer. However, on those evenings the child's mobile device is also at the soccer field. If, for example, the user forgot her mobile device at the soccer field a security event might be triggered once the child's mobile device leaves the geolocation of the soccer field. Presence or absence of other mobile devices may comprise an additional dimension of the temporal-geo-location map.

Returning to process 1300, when the current temporal-geo-location varies more than a threshold amount, process 1300 proceeds along the "yes" path to decision point 1312. At decision point 1312 the threshold may be adjusted based on the presence of other mobile devices in the same geolocation as the mobile device. When the threshold is adjusted, process 1300 proceeds along the "yes" path and returns to decision point 1310 to reevaluate based on the adjusted threshold. When the threshold amount of variance is not adjusted, process 1300 proceeds along the "no" path to operation 1314 and initiates a security event. The security event may comprise shutting down the mobile device, initiating an automatic phone call or text message to another device that includes the current location of the mobile device, requiring input of a password before the mobile device can be used, and the like. The user 104 may manually turn off the security events if, for example, the user 104 is travelling to a new place (or travelling at a new time) and wishes to avoid "false positive" security events.

Figure 14:
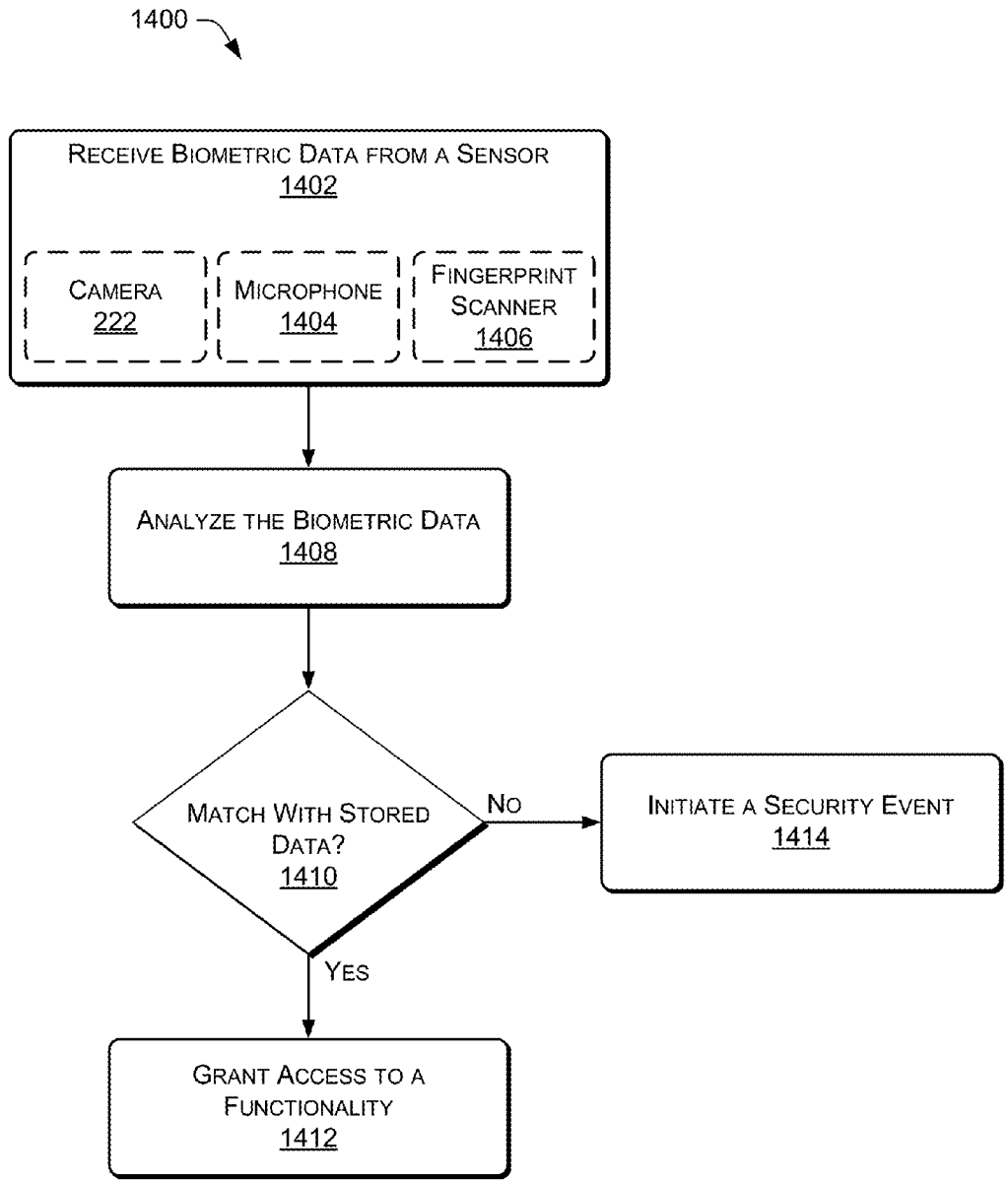
FIG. 14 is a flow diagram of an illustrative process for securing a mobile device based on biometric data.

FIG. 14 illustrates process 1400 for securing a device based on biometric data. Providing security based at least in part on biometric data can minimize opportunities for someone other than a legitimate user of a mobile device to misuse the mobile device by, for example, making unauthorized transactions with merchants. In order to balance between providing the zero-interaction transaction experience and validating the user's identity, biometric data may be solicited periodically such as once per hour or once per day (or at any periodic or random time) in order to continue using the zero-interaction transaction feature. Alternatively, in implementations in which the user makes transactions with a single interaction, entering biometric data may comprise that single interaction.

At operation 1402, biometric data is received from a sensor of the mobile device. Many mobile devices, such as the mobile device 104 illustrated in FIG. 2, are equipped with input devices that may be used for multiple purposes including receiving biometric data. For example, the mobile device 104 may include a camera 222. The mobile device may also include a microphone 1404. In other implementations, the input device that collects biometric data may be used specifically for collecting biometric data such as a fingerprint scanner 1406. Other types of general purpose input devices used to collect biometric data and/or special-purpose biometric data input devices are also envisioned within the scope of this disclosure.

Next at operation 1408, the biometric data is analyzed. In some implementations, the biometric data may be analyzed by a processor and software present on the mobile device itself This implementation may allow the mobile device to offer stand-alone confirmation of a user's identity without a need to access a network or other computing device. In other implementations, the biometric data may be sent from the mobile device to another computing device for analysis. This implementation may allow more sophisticated and computationally intensive techniques for analyzing biometric data than could be readily implemented on a mobile and potentially low-power device. Analysis of the biometric data may convert analog input into digital data or convert a complex set of data such as a fingerprint into a relatively simple string of data like a hash code. The analysis of the biometric data may be matched to the type of data received. For example, if the camera 222 is used to collect biometric data by taking a picture of a person's face, that picture may be analyzed using facial recognition techniques. Alternatively, if the microphone 1404 is used to record a sample of a voice, then that data may be analyzed by using voice recognition techniques. For added levels of security, multiple types of biometric data may be used together such as, for example, taking a picture of a person's face and recording that person's voice then analyzing both sets of biometric data.

At decision point 1410, a determination is made as to whether the analysis of the input of biometric data matches stored biometric data associated with the mobile device. For example, the hash code generated from a fingerprint scan could be compared to a stored hash code that the user entered while she was setting up the mobile device. In some implementations, the stored biometric data which is used for comparison is stored locally on the mobile device. The biometric data may be stored, for example, as part of the user information 210 shown in FIG. 2. Again, this may allow the mobile device to provide stand-alone analysis. In other implementations, the stored biometric data may be stored remote from the mobile device, for example, as a part of the user profile 404 illustrated in FIG. 4. Storing the biometric data remotely may conserve memory space on the mobile device and may provide greater security by preventing an unauthorized person from extracting biometric data from a lost or stolen mobile device.

When the analysis of the biometric data matches the stored biometric data, process 1400 proceeds along the "yes" path and grants access to a functionality of the mobile device at operation 1412. The functionality may comprise any type of operation feature, data, and the like available on or implemented by the mobile device. For example, the ability to initiate and complete a transaction with a merchant is one type of functionality. The ability to make phone calls is a type of functionality on mobile telephone devices. Associating a particular mobile device with an individual user's identity is another type of functionality. For example, a network server such as the server(s) 118 illustrated in FIG. 3 may associate a user ID (1) 208 stored on a network with a serial number of the mobile device based at least in part upon a login that uses biometric data. In this implementation, the user could interact with multiple mobile devices, yet have each device tied to his or her unique user identifier 208 and other things which are linked to that user identifier 208 such as the payment information 402, user profile 404, and a list of trusted merchant(s) 408 as shown in FIG. 4.

If, at decision point 1410 it is determined that the analyzed biometric data does not match the stored biometric data, process 1400 may proceed along the "no" path and initiate a security event at operation 1414. The security event may be anything from shutdown and complete deletion of all stored data on the mobile device to a warning message displayed on the mobile device. In some implementations, the security event may limit functionalities of the mobile device, such as to those functionality that do not incur additional charges. Other types of security events may include sending an e-mail or making a phone call that communicates the current location of the mobile device. The security event at operation 1414 may be the same or different than the security event triggered at operation 1314 illustrated in FIG. 13.

Security events may be triggered by other mechanisms besides variance from a temp oral-geo-location map or failure of a biometric login. In some implementations, the user may be able to manually initiate a security event remotely from the mobile device. Some mechanisms of achieving this include calling a phone number, sending an e-mail, entering a command from a webpage, or the like. The web page may be a security web page for that mobile device that shows a current geolocation of the mobile devices as well as past transaction data and the like. For example, if the user suspects that his or her mobile device was lost or stolen that user could call a certain phone number, enter a code, and then a signal would be sent over a network and broadcast to the mobile device causing the mobile device to temporarily shut down. In other implementation, different triggers may be used to initiate a security event. Some of those triggers include financial transactions, for example, sending out an alert message when a large purchase is initiated using the mobile device.

Advertising and Promotions

Figure 15:
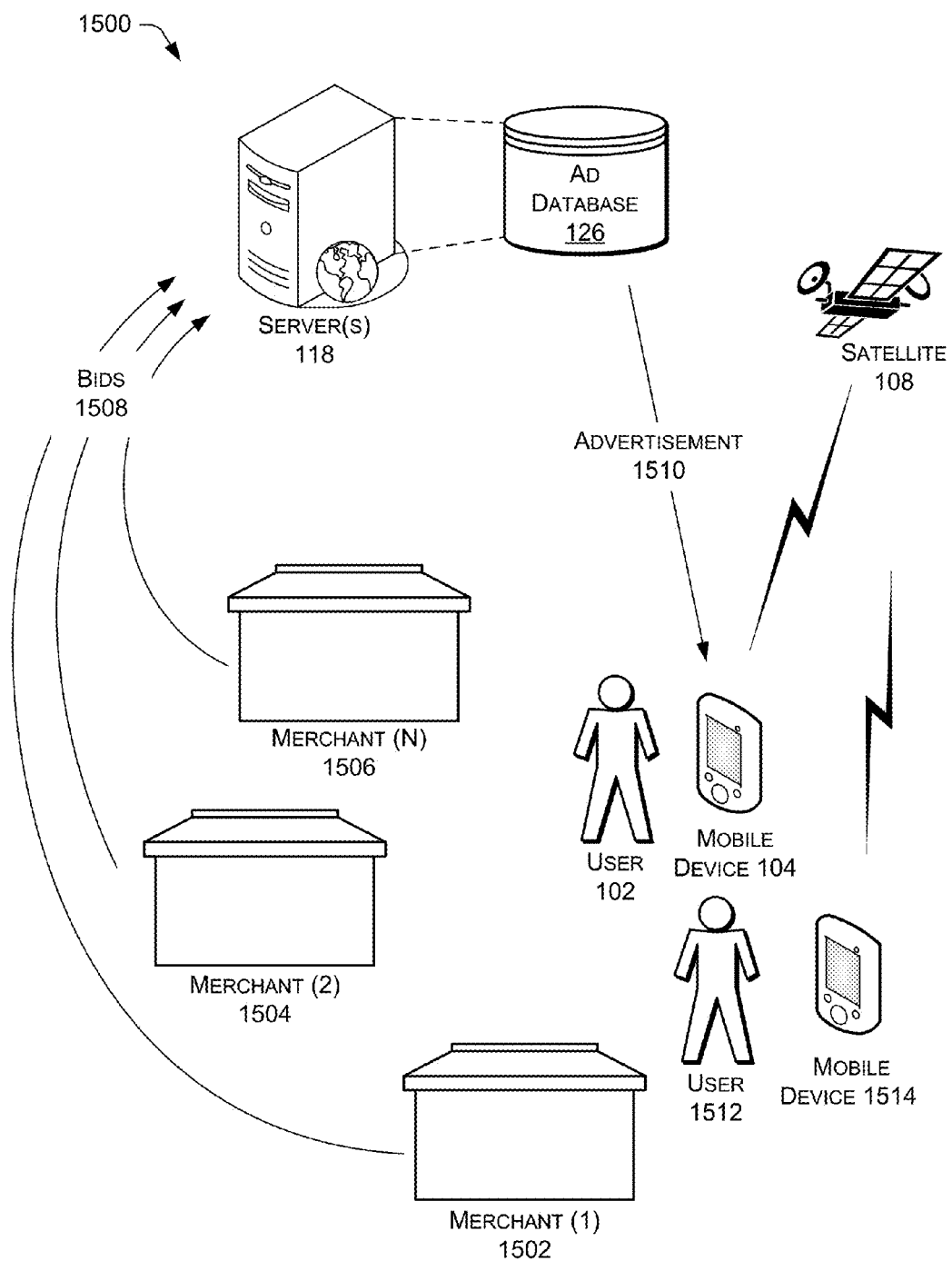
FIG. 15 shows an illustrative architecture for providing merchant advertisements or promotions to mobile devices at or near the merchant.

FIG. 15 shows an illustrative architecture 1500 for providing merchant advertisements or promotions to mobile devices at or near the merchant. Mobile devices that provide the features for mobile electronic commerce described above may also be desirable targets for merchants to advertise on in order to drive that mobile electronic commerce. In the architecture 1500, a plurality of merchants is illustrated as merchant (1) 1502, merchant (2) 1504, and merchant (N) 1506 where N may be any number greater than two. The merchants may submit bids 1508 to the server(s) 118. The bids 1508 may indicate an amount of money that the respective merchants are willing to pay to have an advertisement 1510 sent to a mobile device. The advertisements 1510 may be supplied by an advertisement database 126 as illustrated in FIG. 4.

One user 102 and one mobile device 104 receiving the advertisements 1510 may be the same as illustrated in FIG. 1. There may be other users 1512 each having a respective mobile device 1514. Although only two users and only two mobile devices are illustrated in FIG. 15, it is to be understood that any number of users and mobile devices may exist in this architecture and may be appropriate recipients for an advertisement 1510.

Each of the mobile devices 104 and 1514 may receive geolocation information from a satellite 112 or other source. The respective mobile devices 104 and 1514 may receive geolocation information from different sources (e.g., a radio antenna for one mobile device and a WiFi hotspot for the other mobile device). The geolocation of the mobile devices 104 and 1514 may be matched with geolocation(s) 418 associated with advertisement content 416 as illustrated in FIG. 4. This may provide location-relevant advertising to the mobile devices 104 and 1514.

Figure 16:
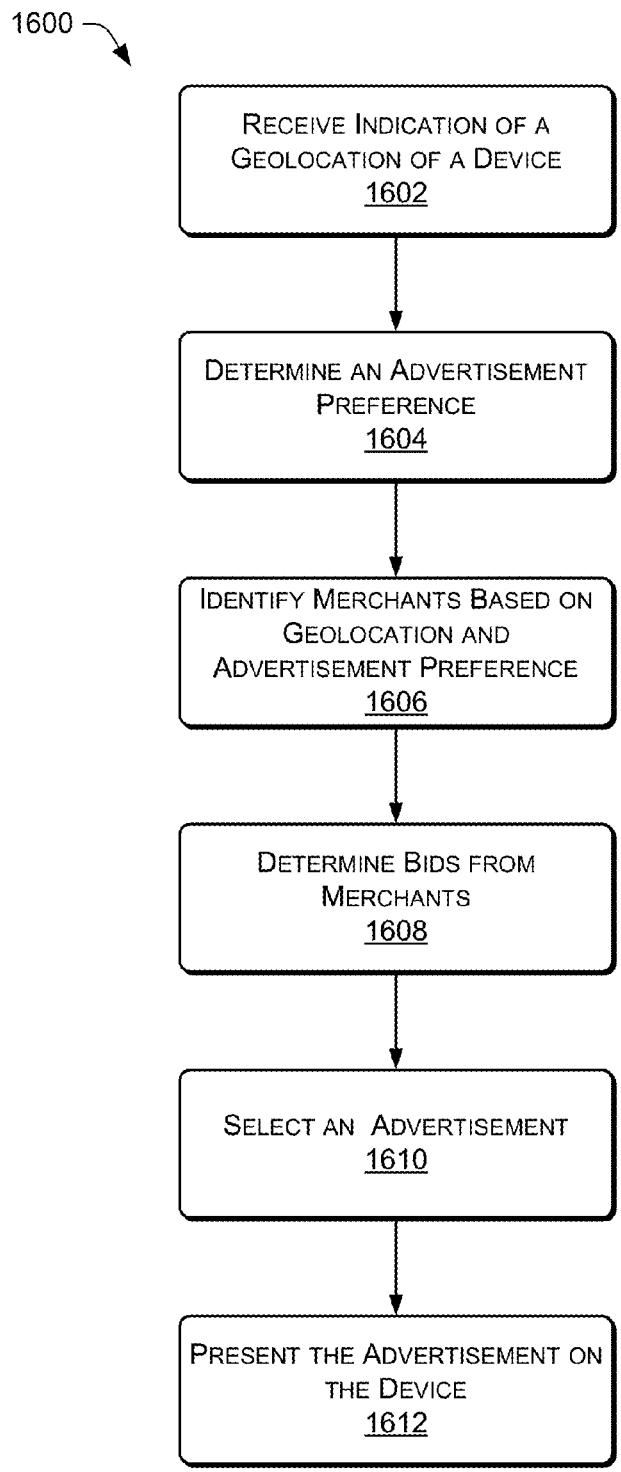
FIG. 16 is a flow diagram of an illustrative process for presenting advertisements on a mobile device based on bids submitted by merchants.

FIG. 16 illustrates process 1600 for presenting advertisements on a device based on bids submitted by merchants. At operation 1602, an indication of a geolocation of a mobile device is received. The geolocation may be determined in reference to the satellite 112 illustrated in FIG. 15. At operation 1604, an advertisement preference of a user of the mobile device is determined. The system may be configured so that a user receives no advertisements unless a user affirmatively opts in to receive advertisements. The user preference information may be part of a user profile such as user profile 404 illustrated in FIG. 4. The advertisement preference may also specify which categories of advertisements and from which merchants the user is willing to receive advertisements. In some implementations, a list of trusted merchant(s) 408 may determine the merchants that are able to send advertisements to the user. The advertising preferences may comprise any other type of user information. For example, the user information may include information about past transactions between the user and the merchant. This may be used to create targeted advertisements, for example, by telling the user about items that he or she purchased in the past and may wish to purchase again (e.g., tall latte) or about related items that the user may also wish to purchase (e.g., you purchased a chili dog for lunch, would you like to purchase antacids at our nearby drugstore?).

Next, at operation 1606, merchants are identified based on the geolocation of the mobile device and on the advertisement preference of the user. The identified merchants may include only merchants within a specified distance from the mobile device. This can limit the possible source of advertisements to only those merchants that are located proximate to the geolocation of the mobile device. For example, if the user is walking down a street lined with restaurants, restaurants along that street may be eligible to advertise on the mobile device but restaurants located across town would not. A threshold or radius within which merchants are identified as being proximate to the mobile device may vary based on the type of advertisement. For example, restaurant advertisements may only be sent to mobile devices that are within a quarter mile of the restaurant geolocation. However, hotel advertisements may be sent to users with mobile devices within five miles of the hotel geolocation. Additionally, the advertisements may be sorted by time such that restaurant advertisements may be more common or cover a larger geographic area in the hours before dinner time and hotel advertisements may cover a larger geographic area earlier in the day but progressively narrow the geographic focus as it becomes night.

Once a pool of merchants has been identified based on at least geolocation and advertisement preference, bids are received from those merchants at operation 1608. The bids may be received and processed by the bidding module 312 illustrated in FIG. 3. Each of the bids may include different factors that the merchant is bidding on as well as a maximum bid price, a range of bid prices, or other bidding characteristics. For example, a merchant may bid a higher amount to place advertisements on the mobile device of a user who has made purchases from that merchant in the past. As a further example, the merchant may bid more to place advertisements on mobile devices that are nearer to the merchant and bid less to place advertisements on mobile devices that are farther away from the merchant.

At operation 1610, an advertisement is selected. The selected advertisement may be determined based on the bid price, the user preferences, and other factors such as, for example, whether the merchant has enough money in an advertising account to pay the bid price. In some implementations, a winning bid that determines the selected advertisement may be the bid associated with a largest amount of money. Other bidding or auction arrangements are also possible such as, for example, the highest bidder paying an amount bid by the second highest bidder.

Next, at operation 1612, the selected advertisement is presented on the mobile device. The advertisement may be supplied from the advertisement database 126 illustrated in FIGS. 4 and 15. More specifically, the advertisement may be generated based on the advertisement content 416 illustrated in FIG. 4. The advertisement may be presented on the mobile device as a banner, in a specialized ad window, or the like. In some implementations, the advertisement may be integrated with a map so that the user can easily identify the location of the merchant that corresponds to the advertisement. The advertisements may remain on the mobile device for variable periods of time. Some advertisements may expire after a fixed amount of time such as one minute. Advertisements may also expire based on geolocation of the mobile device so that when the mobile device leaves a geolocation near the merchant, that merchant's advertisement is replaced by a different advertisement.

Figure 17:
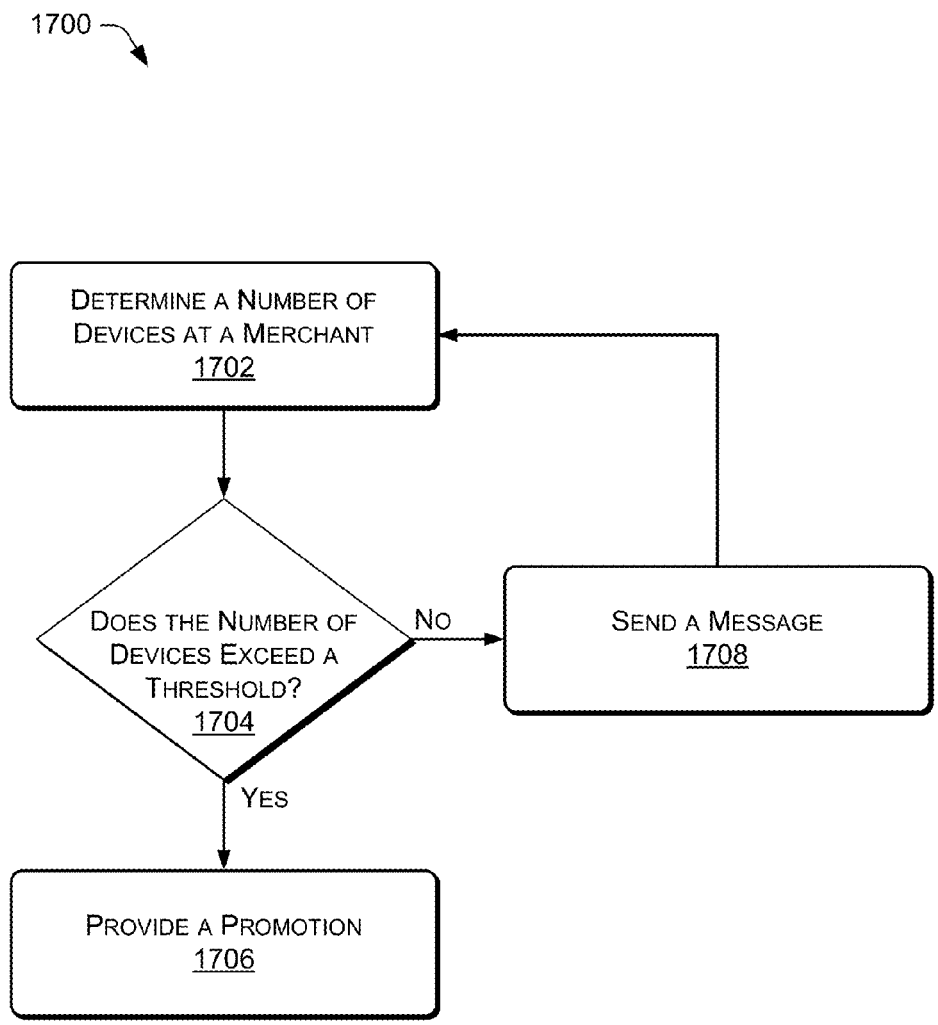
FIG. 17 is a flow diagram of an illustrative process for providing a promotion to mobile devices when a number of mobile devices at a merchant exceeds a threshold.

FIG. 17 illustrates process 1700 for providing a promotion to devices when a number of devices at a merchant exceeds a threshold. Advertisements may contain information touting the virtues of a merchant or the advertisements may also include a coupon or some type of promotion that may incentivize users to visit the merchant. Merchants may desire driving a large amount of traffic through their stores and choose to structure promotions to incentivize many users to come into their stores at the same time. This may also contribute to a certain atmosphere or ambiance of a busy, lively merchant. Social networking functionality on mobile devices may be used to spread these types of promotions "virally" or directly from user to user.

At operation 1702, a number of mobile devices at a merchant is determined based on geolocation information provided by each of the mobile devices. For example, each mobile device could detect its own geolocation based on a satellite or other system, and expose that information to a server(s) 118 for inclusion in a map 310 in which the geolocations of multiple mobile devices are correlated with the geolocation of a merchant. The number of mobile devices may represent a number of unique users present at that geolocation.

Next, at decision point 1704, the number of mobile devices at the merchant is compared to a threshold number. The threshold number may be set by the merchant as, for example, a number of people the merchant would like to have on its premises. In this implementation, the threshold may be an integer number. The threshold number may be based at least in part on a number of mobile devices at the merchant for which the merchant is designated as a trusted merchant. For example, if the merchant wishes to bring in new users with the hopes that they will designate this merchant as a trusted merchant, the threshold may be set as a ratio such the threshold is exceeded when, for example, more than a third of all mobile devices present do not designate this merchant as a trusted merchant. When the number of mobile devices at the merchant exceeds the threshold number, process 1700 proceeds from decision point 1704 along the "yes" path to operation 1706 and provides a promotion to the users. The promotion may be a discount for a good or service available at the merchant. The promotion may be provided to all the users present at the merchant or to only a subset. For example, to reward loyal customers, a coupon may be sent to the mobile devices of users who have transacted with this merchant in the past.

The promotion may be personalized for each of the users of the mobile devices based on user information associated with the mobile device. This using information may be the same as the user information 210 illustrated in FIG. 2 or the user information 122 illustrated in FIG. 4. For example, in a coffee shop each user may receive a coupon for one dollar off the coffee drink he or she has indicated as a favorite drink. Other user information may also be analyzed to personalize the promotions. The coupon may incentivize the user to return to the merchant by providing a discount at a later time (e.g., this coupon is valid from tomorrow for the next 10 days) or by geolocation (e.g., please use this coupon at one of our other stores). The coupon may also be associated with the user identification so that the coupon is applied automatically the next time that user conducts a transaction with that merchant.

If however, the number of mobile devices at the merchant does not exceed the threshold, process 1700 may proceed along the "no" path to operation 1708 and send a message to the mobile devices. The message may be a notification of how many more devices must be present at the merchant in order to cross the threshold. This could be a source of viral marketing by encouraging users to call or text their friends to come to this merchant location—with their mobile devices—so that the threshold is crossed and everybody receives the promotion. In implementations, in which mobile devices are counted as being at the geolocation of the merchant only when the user of that mobile device opts to expose his or her geolocation to the merchant this may encourage reticent users to share this information in order to receive the promotion. Many other implementations that take advantage of the "peer pressure" effect by providing a promotion for aggregate behavior are also possible.

There may also be instances in which a large number of customers, as indicated by a number of mobile devices, may be undesirable to the merchant and or the users. Thus in one implementation, the "advertisement" may comprise a notification about how many mobile devices are present at a merchant and to what extent this number exceeds a maximum or threshold number. For example, a restaurant may report that more mobile devices are present at its geolocation than the restaurant has seats. With this information a user could be forewarned that he or she may have to wait for a table at that restaurant. As another example, an airline may identify mobile devices of users scheduled to be on a flight that are not yet at the airport (or not within a threshold distance of the boarding gate) to inform these users that the fight is overbooked. This implementation may use geolocation in conjunction with user information 122 (e.g., the flight reservation) to provide an offer to take a later flight (perhaps in exchange for an upgrade or such) to those customers most likely to avail themselves of that offer. In these instances the process flow from decision point 1704 may be switched in that the message is sent out if the number of user devices exceeds the threshold number.

After sending the message at operation 1708, process 1700 may return to operation 1702 and again determine a number of devices at the merchant. This may repeat until the threshold is crossed or until a period during which the promotion periods ends. The process illustrated in FIG. 16 may be combined with process 1700. For example, merchants may bid for the right to send an advertisement that comprises a promotion.

CONCLUSION

These processes discussed above are each illustrated as a collection of blocks in a logical flow graph, which represent a sequence of operations that can be implemented in hardware, software, or a combination thereof In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method for initiating a security event in response to a current geolocation varying from a geolocation signature by more than a threshold amount, the computer-implemented method comprising:
   determining, by one or more computing systems, at a plurality of different times and different locations, a geolocation of a mobile device and a timestamp associated with the geolocation to create geolocation data;
   creating, by at least one of the one or more computing systems, the geolocation signature for the mobile device based at least in part on the geolocation data;
   comparing, by at least one of the one or more computing systems, a current geolocation with the geolocation signature to determine if the current geolocation varies from the geolocation signature by more than a threshold amount; and
   initiating, by at least one of the one or more computing systems, a security event in response to the current geolocation varying from the geolocation signature by more than the threshold amount.

2. The computer-implemented method as recited in claim 1, further comprising selecting, by at least one of the one or more computing systems, the plurality of different times using a predetermined interval.

3. The computer-implemented method as recited in claim 1, wherein the mobile device comprises a first mobile device, and wherein the comparing comprises comparing a first current geolocation of the first mobile device at a particular time with a second current geolocation of a second mobile device at the particular time; and determining that the first current geolocation of the first mobile device exceeds a threshold distance from the second current geolocation of the second mobile device at the particular time.

4. The computer-implemented method as recited in claim 3, wherein the initiating comprises initiating the security event in response to the first current geolocation of the first mobile device not being within the threshold distance of the second current geolocation of the second mobile device at the particular time.

5. The computer-implemented method as recited in claim 3, further comprising:
   determining, by at least one of the one or more computing systems, at a plurality of different times and different locations, a geolocation of the second mobile device and a timestamp associated with the geolocation of the second mobile device to create geolocation data associated with the second mobile device; and
   creating, by at least one of the one or more computing systems, a geolocation signature for the second mobile device based at least in part on the geolocation data associated with the second mobile device.

6. The computer-implemented method as recited in claim 5, wherein the comparing comprises comparing the first current geolocation of the first mobile device at a particular time stored in the geolocation signature of the first mobile device with the second current geolocation of the second mobile device at the particular time stored in the geolocation signature of the second mobile device to determine if the first current geolocation of the first mobile device is within the threshold distance of the second current geolocation of the second mobile device at the particular time stored in the geolocation signatures of the first and second mobile devices.

7. The computer-implemented method as recited in claim 6, wherein the initiating comprises initiating the security event in response to the first current geolocation of the first mobile device not being within the threshold distance of the second current geolocation of the second mobile device at the particular time stored in the geolocation signatures of the first and second mobile devices.

8. The computer-implemented method as recited in claim 3, wherein the security event comprises one or more of: shutting down the first mobile device, the second mobile device, or both the first and second mobile devices, sending an automatic communication from the first mobile device, the second mobile device, or both the first and second mobile devices, or requiring input of a password at the first mobile device, the second mobile device, or both the first and second mobile devices.

9. The computer-implemented method as recited in claim 3, wherein the threshold distance is determined at least in part from user input received at the first mobile device or the second mobile device.

10. A computer-implemented method comprising:
comparing, by at least one of one or more computing systems, a first current geolocation of a first device at a particular time with a second current geolocation of a second device at the particular time;
determining, by at least one of the one or more computing systems, that the first current geolocation of the first device exceeds a threshold distance from the second current geolocation of the second device at the particular time; and
initiating, by at least one of the one or more computing systems in response to the determining, a security event.

11. The computer-implemented method as recited in claim 10, wherein the threshold distance is determined at least in part from user input received at the first device or the second device.

12. The computer-implemented method as recited in claim 10, wherein the security event comprises one or more of: shutting down the first device, the second device, or both the first and second devices, sending an automatic communication from the first device, the second device, or both the first and second devices, or requiring input of a password at the first device, the second device, or both the first and second devices.

13. The computer-implemented method as recited in claim 10, further comprising:
determining, by at least one of the one or more computing systems, multiple different geolocations of the first device and the second device over time; and
storing, by at least one of the one or more computing systems, individual ones of the geolocations in association with a time at which the individual ones of the geolocations were detected to create a geolocation signature for the first device and a geolocation signature for the second device.

14. The computer-implemented method as recited in claim 13, wherein the comparing comprises comparing the first geolocation of the first device at a particular time stored in the geolocation signature of the first device with the second current geolocation of the second device at the particular time stored in the geolocation signature of the second device to determine if the first current geolocation of the first device is within the threshold distance of the second current geolocation of the second device at the particular time stored in the geolocation signatures of the first and second devices; and
wherein the initiating comprises initiating the security event in response to the first current geolocation of the first device not being within the threshold distance of the second current geolocation of the second device at the particular time stored in the geolocation signatures of the first and second devices.

15. A system for initiating a security event in response to a first current geolocation of a first device exceeding a threshold distance from a second current geolocation of a second device, the system comprising:
one or more processors; and
memory storing computer readable instructions, that, when executed by the one or more processors cause the one or more processors to:
compare a first current geolocation of a first device with a second current geolocation of a second device;
determine that the first current geolocation of the first device exceeds a threshold distance of the second current geolocation of the second device; and
initiate, in response to the determining, a security event.

16. The system as recited in claim 15, wherein the comparing of the first current geolocation of the first device with the second current geolocation of the second device occurs at a regular frequency.

17. The system as recited in claim 15, further comprising memory storing computer readable instructions that, when executed by the one or more processors, cause the one or more processors to determine multiple different geolocations of the first device and the second device over time; and
store individual ones of the geolocations in association with a time at which the individual ones of the geolocations were detected to create a geolocation signature for the first device and a geolocation signature for the second device.

18. The system as recited in claim 17, wherein the comparing comprises comparing the first geolocation of the first device at a particular time stored in the geolocation signature of the first device with the second current geolocation of the second device at the particular time stored in the geolocation signature of the second device to determine if the first current geolocation of the first device is within the threshold distance of the second current geolocation of the second device at the particular time stored in the geolocation signatures of the first and second devices; and
wherein the initiating comprises initiating the security event in response to the first current geolocation of the first device not being within the threshold distance of the second current geolocation of the second device at the particular time stored in the geolocation signatures of the first and second devices.

19. The system as recited in claim 15, wherein the threshold distance is determined at least in part from user input received at the first device or the second device.

20. The system as recited in claim 15, wherein the security event comprises at least one of:
shutting down the first device, the second device, or both the first and second devices,
sending an automatic communication from the first device, the second device, or both the first and second devices, or
requiring input of a password at the first device, the second device, or both the first and second devices.

* * * * *